(12) United States Patent
Goodsell et al.

(10) Patent No.: US 12,510,137 B2
(45) Date of Patent: Dec. 30, 2025

(54) AUTOMATIC MECHANICAL TENSIONER WITH ADJUSTABLE INITIAL POSITION

(71) Applicant: BorgWarner Inc., Auburn Hills, MI (US)

(72) Inventors: Joseph P. Goodsell, Groton, NY (US); Joseph Manley, Lansing, NY (US); Bradley F. Adams, Homer, NY (US); John Crockett, Freeville, NY (US); Sean R. Simmons, Ithaca, NY (US); Richard Love, Newfield, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/785,969

(22) Filed: Jul. 26, 2024

(65) Prior Publication Data

US 2025/0043851 A1    Feb. 6, 2025

Related U.S. Application Data

(60) Provisional application No. 63/516,749, filed on Jul. 31, 2023.

(51) Int. Cl.
*F16H 7/08*    (2006.01)

(52) U.S. Cl.
CPC ......... *F16H 7/0836* (2013.01); *F16H 7/0848* (2013.01); *F16H 2007/0853* (2013.01)

(58) Field of Classification Search
CPC .......... F16H 7/0848; F16H 2007/0853; F16H 2007/0865; F16H 2007/0891; F16H 7/08

USPC ......................................................... 474/110
See application file for complete search history.

(56) References Cited

U.S. PATENT DOCUMENTS

| | | | |
|---|---|---|---|
| 2,723,566 A | 11/1955 | Hyman | |
| 2,963,918 A | 12/1960 | Nigel | |
| 4,337,055 A | 6/1982 | Mackay et al. | |
| 7,641,576 B2 | 1/2010 | Redaelli et al. | |
| 10,781,893 B2 | 9/2020 | Monsy et al. | |
| 2002/0165056 A1 | 11/2002 | Ullein | |
| 2006/0270500 A1* | 11/2006 | Yamamoto | F16H 7/0836 474/109 |
| 2007/0021251 A1 | 1/2007 | Redaelli et al. | |

(Continued)

FOREIGN PATENT DOCUMENTS

| | | |
|---|---|---|
| DE | 4428556 A1 | 2/1996 |
| JP | 2004044749 A | 2/2004 |
| JP | 2006125476 A | 5/2006 |

*Primary Examiner* — Anna M Momper
*Assistant Examiner* — Mark K Buse
(74) *Attorney, Agent, or Firm* — Brown & Michaels, PC

(57) ABSTRACT

An automatic mechanical tensioner assembly with a shipping and installation position in which a collar engages a fixed hollow sleeve, limiting or securing a moveable tensioner housing in place against the force of a spring. The collar has a semicircular body defining an inner circumference extending from a first end to a second end of the body. The semicircular body has two axially extending flanges defining a cutout, and a collar tab extending radially from the semicircular body. In the shipping and installation position, the first end of the collar engages with a delivery groove of the hollow sleeve, biasing the moveable housing towards an anti-rotation washer engaged with an end of the fixed hollow sleeve and compressing the spring.

25 Claims, 29 Drawing Sheets

(56) References Cited

U.S. PATENT DOCUMENTS

| | | |
|---|---|---|
| 2009/0205206 A1* | 8/2009 | Markley ................... F16H 7/08 474/140 |
| 2011/0081997 A1* | 4/2011 | Markely ............... F16H 7/0848 474/110 |
| 2011/0237371 A1 | 9/2011 | Neary |
| 2012/0040790 A1 | 2/2012 | Perissinotto et al. |
| 2013/0203534 A1* | 8/2013 | Schmid ................. F16H 7/0836 474/101 |
| 2013/0303318 A1* | 11/2013 | Hofmann ................. F16H 7/08 474/110 |
| 2015/0345596 A1* | 12/2015 | Lindner ................. F01L 1/022 474/111 |
| 2017/0370447 A1* | 12/2017 | Freemantle ........... F16H 7/0848 |

* cited by examiner

AUTOMATIC MECHANICAL TENSIONER WITH ADJUSTABLE INITIAL POSITION

CROSS-REFERENCE TO RELATED APPLICATIONS

This application claims one or more inventions which were disclosed in Provisional Application No. 63/516,749, filed Jul. 31, 2023, entitled "ADJUSTABLE POLE TENSIONER WITH RATCHET". The benefit under 35 USC § 119 (e) of the United States provisional application is hereby claimed, and the aforementioned application is hereby incorporated herein by reference.

BACKGROUND

The present invention relates to tensioners, and more specifically to automatic mechanical tensioner with an adjustable position.

SUMMARY

According to one embodiment of the present invention, an automatic mechanical tensioner assembly is disclosed. The automatic mechanical tensioner comprising: a hollow sleeve, a moveable housing, an anti-rotation washer, a spring and a collar. The hollow sleeve having a first end and a second end, an inner bore extending from the first end to the second end and an outer circumference comprising a delivery groove. The moveable housing having a body with a first end and a second end and a flange extending axially therefrom, the body defining a bore receiving the hollow sleeve and a cutout. The anti-rotation washer comprising a body defining a hole for receiving the second end of the hollow sleeve. The spring between the moveable housing and the anti-rotation washer, biasing the moveable housing towards the first end of the hollow sleeve. The collar comprising a semicircular body defining an inner circumference extending from a first end to a second end of the semicircular body, the semicircular body comprising two axially extending flanges defining a cutout, and a collar tab extending radially from the semicircular body; wherein the inner circumference of the collar receives the plurality of circumferential teeth and the delivery groove. In a shipping and installation position, the first end of the collar engages with the delivery groove of the hollow sleeve, biasing the moveable housing towards the anti-rotation washer and compressing the spring.

According to another embodiment of the present invention, an automatic mechanical tensioner assembly is disclosed. The automatic mechanical tensioner assembly comprises: a hollow sleeve, a moveable housing, a ratchet clip, a retaining clip, an anti-rotation washer, and a spring. The hollow sleeve has a first end and a second end, an inner bore extending from the first end to the second end and an outer circumference comprising a plurality of circumferential teeth and an installation groove having a first installation groove edge and a second installation groove edge defined on the outer circumference proximal to the second end. The moveable housing has a body with a first end and a second end and a flange extending axially therefrom, the body defining a bore extending from the first end to the second end and comprising a ratchet clip groove proximal to the first end of the body and a shipping installation housing groove proximal to the second end of the body, the shipping installation housing groove comprises a first undercut groove; first housing groove edge and a second undercut groove and a second housing groove edge, wherein the bore of the moveable housing receives the hollow sleeve. The ratchet clip is received within the ratchet clip groove of the moveable housing and engageable with the plurality of circumferential teeth of the hollow sleeve. The retaining clip is received within the shipping installation housing groove and/or the installation groove of the hollow sleeve. The anti-rotation washer has a body defining a hole for receiving the second end of the hollow sleeve. The spring is between the moveable housing and the anti-rotation washer, biasing the moveable housing towards the first end of the hollow sleeve. In a shipping and installation position, the retaining clip engages the first installation groove edge of the installation groove of the hollow sleeve and the second housing groove edge of the moveable housing. In a working position, the retaining clip engages the first undercut groove and the first housing groove edge.

According to another embodiment, a method of installing an automatic mechanical tensioner assembly is disclosed. The method comprising: inserting an automatic mechanical tensioner assembly into a bore in the chain drive system in a shipping and installation position, the automatic mechanical tensioner assembly comprising: a hollow sleeve having a first end and a second end, an inner bore extending from the first end to the second end and an outer circumference comprising a plurality of circumferential teeth and a delivery groove proximal to the plurality of circumferential teeth and the first end; a moveable housing having a body with a first end and a second end and a flange extending axially therefrom, the body defining a bore comprising a ratchet clip groove proximal to the first end of the body, wherein the bore receives the hollow sleeve; a ratchet clip received within the ratchet clip groove of the moveable housing and engageable with the plurality of circumferential teeth of the hollow sleeve; an anti-rotation washer comprising a body defining a hole for receiving the second end of the hollow sleeve; a spring between the moveable housing and the anti-rotation washer, biasing the moveable housing towards the first end of the hollow sleeve; a collar comprising a semicircular body defining an inner circumference extending from a first end to a second end of the semicircular body, the semicircular body comprising two axially extending flanges defining a cutout, and a collar tab extending radially from the semicircular body, wherein in the shipping and installation position, the first end of the collar engages with the delivery groove of the hollow sleeve, biasing the moveable housing towards the anti-rotation washer and compressing the spring; inserting a screw rod into the bore of the chain drive and the inner bore of the hollow sleeve; mounting the tensioner face to the radially extending flange of the moveable housing of the automatic mechanical tensioner installed within the bore of the chain drive; pretensioning the automatic mechanical tensioner assembly; and removing the collar by disengaging the collar from the delivery groove on the hollow sleeve, such that the automatic mechanical tensioner is in a working position.

According to another embodiment, an automatic mechanical tensioner assembly is disclosed. The automatic mechanical tensioner assembly comprising: a hollow sleeve, a moveable housing, a ratchet clip, an anti-rotation washer, a spring, a pin and a collar. The hollow sleeve having a first end and a second end, an inner bore extending from the first end to the second end and an outer circumference comprising a plurality of circumferential teeth and a delivery groove proximal to the plurality of circumferential teeth and the first end. The moveable housing having a body with a first end and a second end and a flange extending axially therefrom, the body defining a bore comprising a ratchet clip groove proximal to the first end of the body, wherein the bore receives the hollow sleeve and a pin hole. The ratchet clip received within the ratchet clip groove of the moveable housing and engageable with the plurality of circumferential teeth of the hollow sleeve. The anti-rotation washer comprising a body defining a hole for receiving the second end of the hollow sleeve. The spring between the moveable housing and the anti-rotation washer, biasing the moveable housing towards the first end of the hollow sleeve; and a pin receivable within the pin hole of the moveable housing. The collar comprising a semicircular body defining an inner circumference extending from a first end to a second end of the semicircular body, the semicircular body comprising two axially extending flanges defining a cutout, and a collar tab extending radially from the semicircular body; wherein the inner circumference of the collar receives the plurality of circumferential teeth and the delivery groove. In a shipping and installation position of the automatic mechanical tensioner assembly, the first end of the collar engages with the delivery groove of the hollow sleeve, biasing the moveable housing towards the anti-rotation washer and compressing the spring and the pin is received within the pin hole of the moveable housing, maintaining the moveable housing in a stationary position.

DETAILED DESCRIPTION

Figure 1:
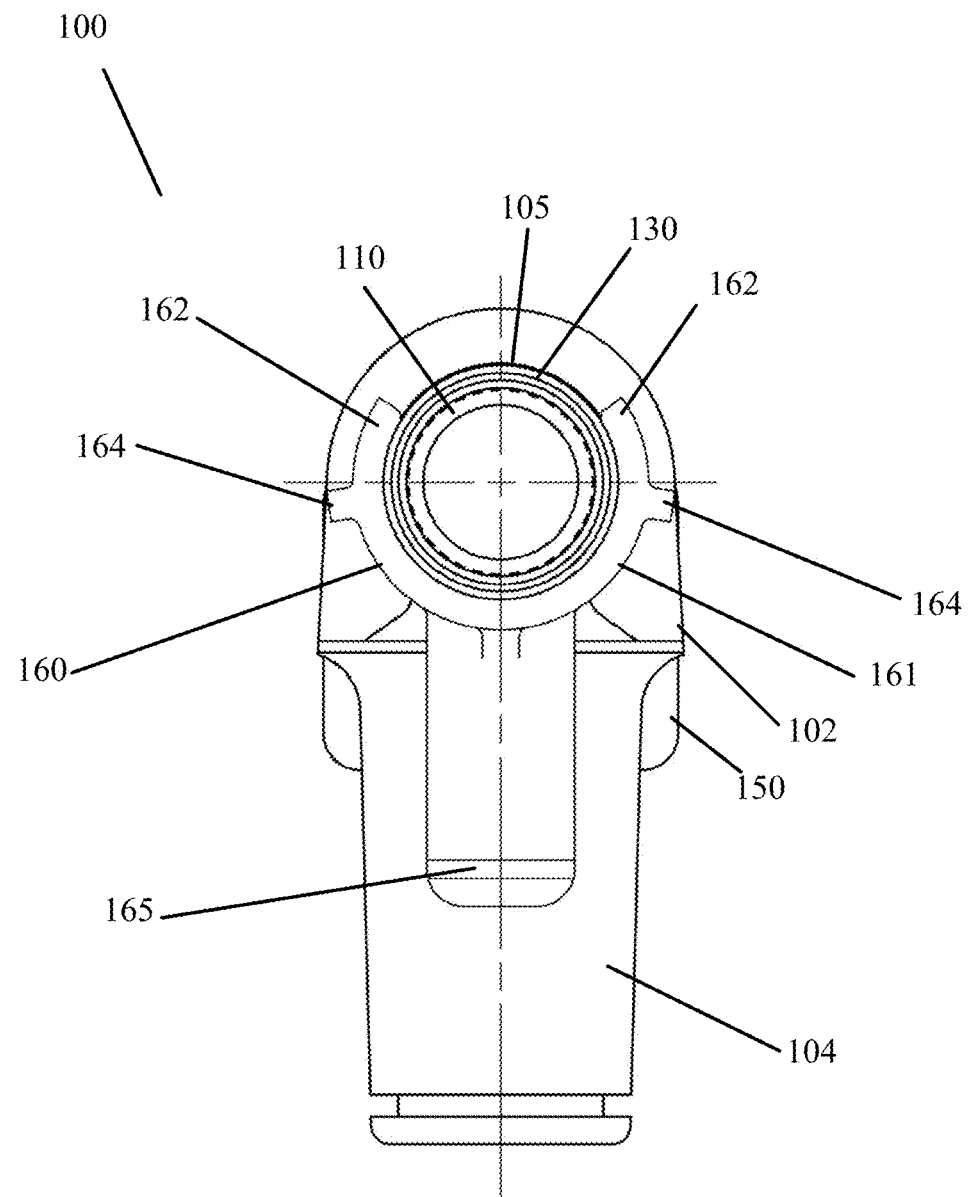
FIG. 1 shows a top view of the tensioner assembly.
Figure 2:
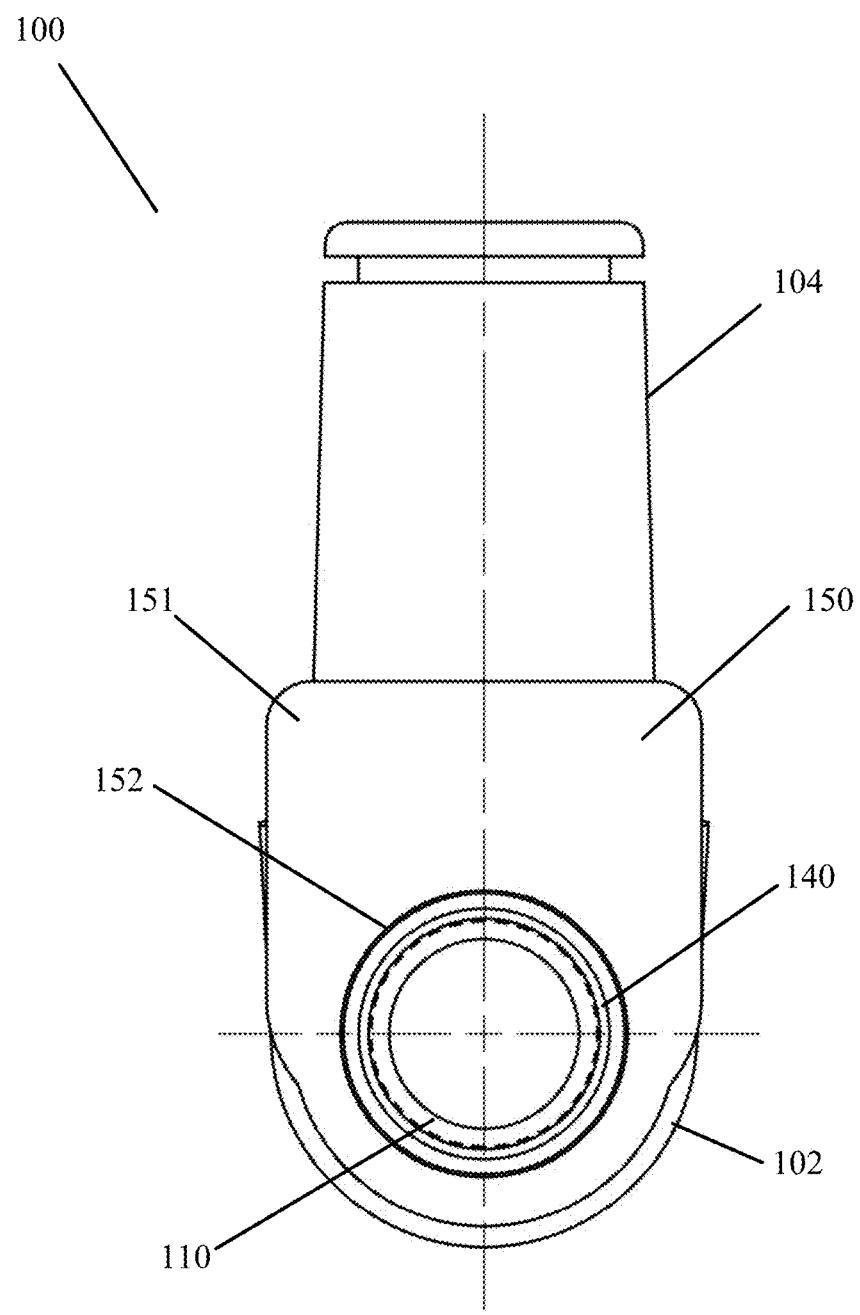
FIG. 2 shows a bottom view of the tensioner assembly.
Figure 3:
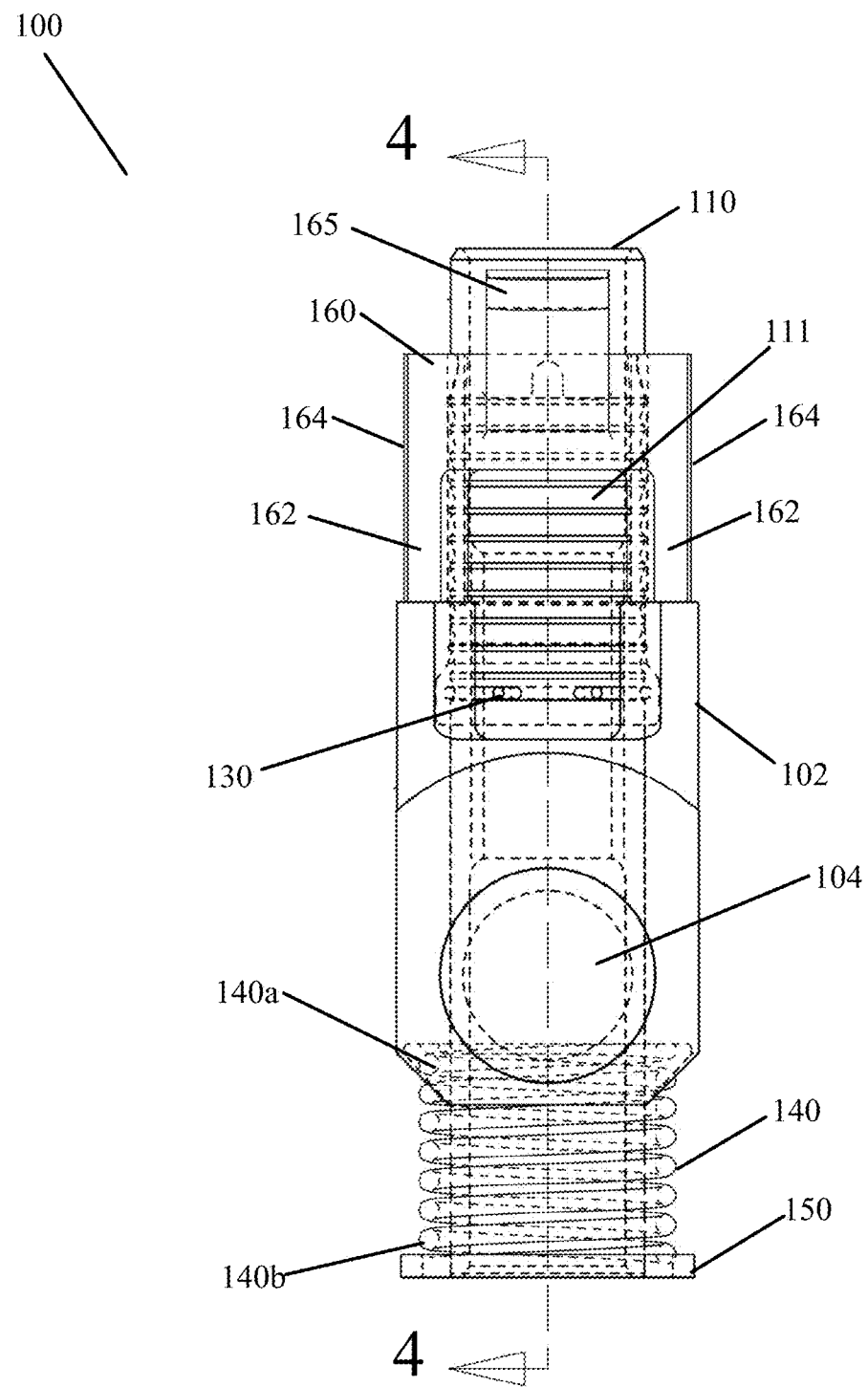
FIG. 3 shows a front view of the tensioner assembly.

FIGS. 1-30b show an automatic mechanical tensioner assembly. The automatic mechanical tensioner assembly 100 is preferably installed within a hole or bore 176 of a driving chain case or chain drive housing 177 that houses a chain drive system with a chain spanning a driven sprocket and a driving sprocket.

The automatic mechanical tensioner assembly 100 has a hollow sleeve 110 having a first end 110a and a second end 110b with a series of circumferential teeth 111 on an outer circumference 110c thereof extending a length between the first end 110a and the second end 110b. At least one of the circumferential teeth is a stop groove 112. The circumferential teeth 111 are formed and spaced to receive a ratchet clip 130. The circumferential teeth 111 and stop groove 112 are angled towards the second end 110b of the hollow sleeve 110. In one embodiment, the circumferential teeth 111 and the stop groove 112 are proximate to the first end 110a of the hollow sleeve 110. Alternatively, the circumferential teeth 111 and stop groove 112 are proximate to the second end 110b of the hollow sleeve 110.

The hollow sleeve 110 defines an inner bore 113 with at least one diameter along a central axis C-C. The inner bore 113 of the hollow sleeve 110 receives a threaded screw rod (not shown). A delivery groove 114 is also present along the outer circumference 110c proximal to the first end 110a sized to receive a collar 160 discussed in further detail below.

Figure 10:
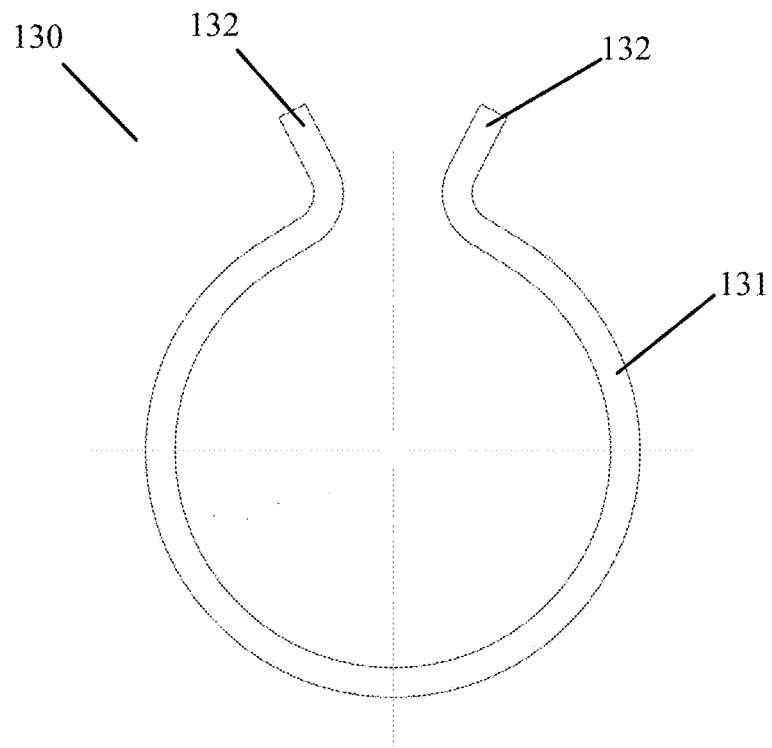
FIG. 10 shows ratchet clip in a free state for a delivery position.

The ratchet clip 130 in a free state is shown in FIG. 10. The ratchet clip 130 has a curved portion 131 inwardly biased to have a free-state diameter less than or equal to a root diameter of the circumferential teeth 111 of the hollow sleeve 110. A pair of ratchet clip legs 132, when moved toward each other against the bias of the curved portion 131, allows the radius of curvature of the curved portion 131 to be increased. The ratchet clip 130 is preferably a formed wire with a round cross-section and more preferably a substantially circular cross-section of the curved portion 131.

Referring to FIGS. 6-9, a moveable tensioner housing 102 has a body 103 connected to a radially extending flange 104. The body 103 has a first end 103a and a second end 103b and defines a bore 105 coaxial to the hollow sleeve along central axis C-C and surrounds at least a portion of the hollow sleeve. The bore 105 extends from the first end 103a to the second end 103b of the body 103. The radially extending flange 104 is perpendicular to the bore 105 defined by the body 103 of the moveable tensioner housing 102 and receives a tensioner face (not shown). Within the bore 105 of the body 103 are ratchet clip grooves 109 which include a series of varying diameters depending on the portion of the bore 105. The ratchet clip grooves 109 includes the first portion 105a at the first end 103a, the second portion 105b, the transition portion 105d and the third portion 105c. A first diameter d1 of the bore 105 is present at a proximal end of the bore and corresponds to a first portion 105a. Adjacent the first portion 105a is a second portion 105b with a second diameter d2. The second portion 105b is connected to a third portion 105c by a transition portion 105d. The third portion 105c has a third diameter d3 which is greater than the first and second diameters d1, d2. After the third diameter d3, the bore returns to the first diameter d1 and a first portion 105a. It is noted that the second diameter d2 is greater than the first diameter d1 and smaller than the third diameter d3.

Figure 4:
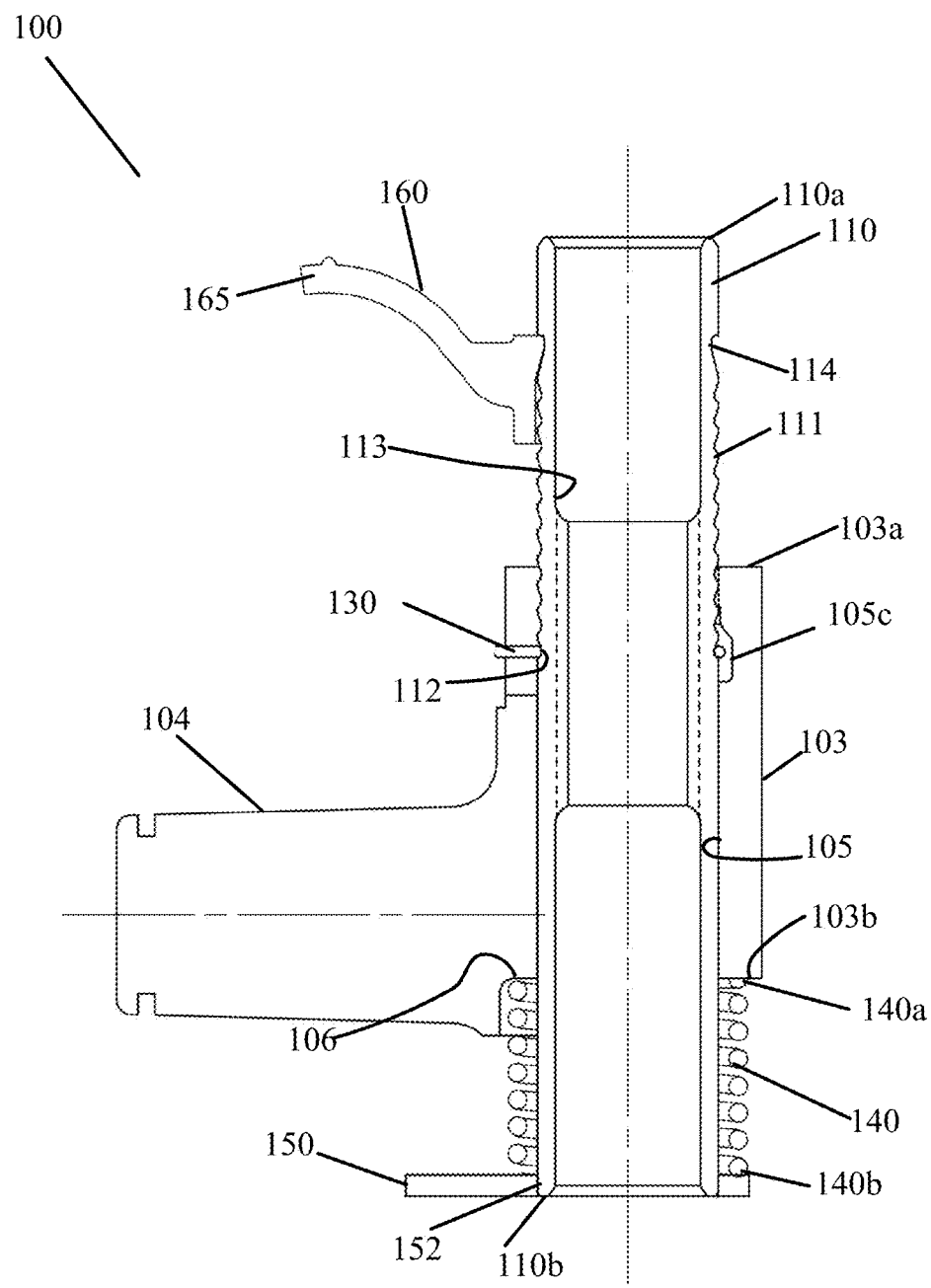
FIG. 4 shows a section view of FIG. 3 along line 4-4.
Figure 5:
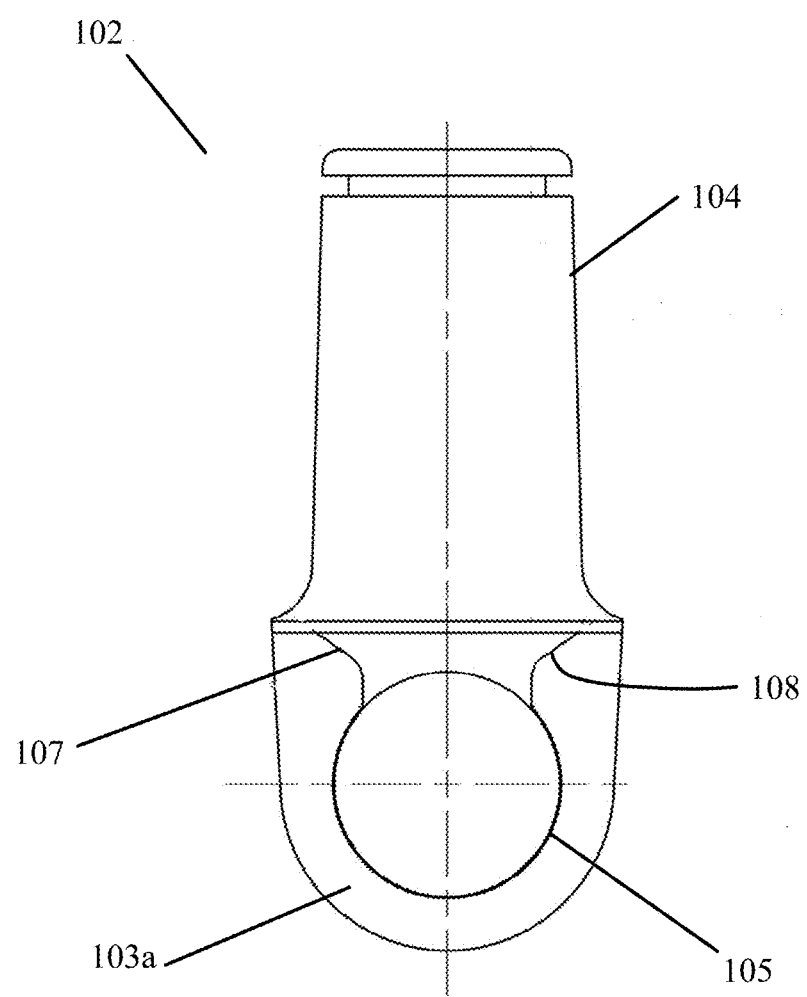
FIG. 5 shows a top view of the body of the tensioner assembly.
Figure 6:
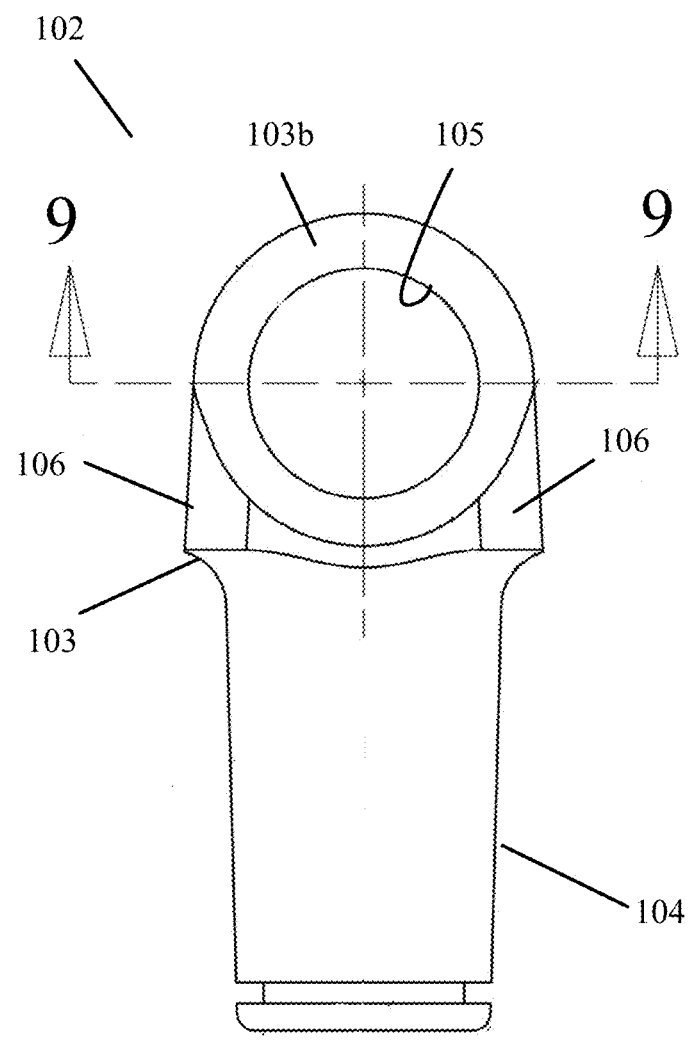
FIG. 6 shows a bottom view of the tensioner body with the anti-rotation washer removed.
Figure 7:
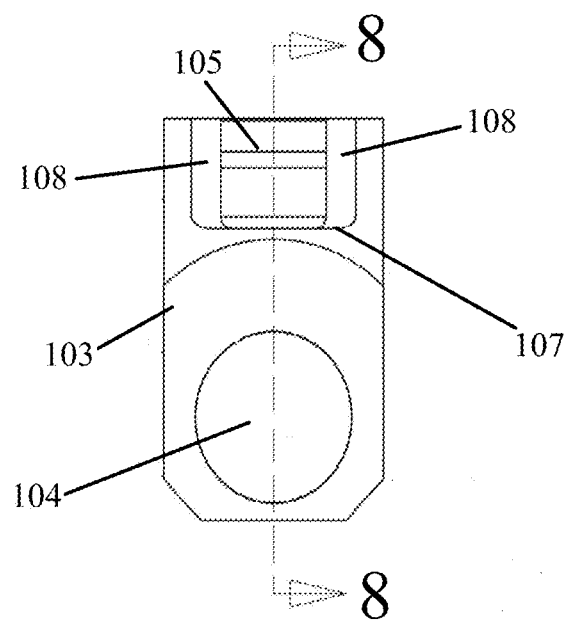
FIG. 7 shows an end view of FIG. 6.
Figure 8:
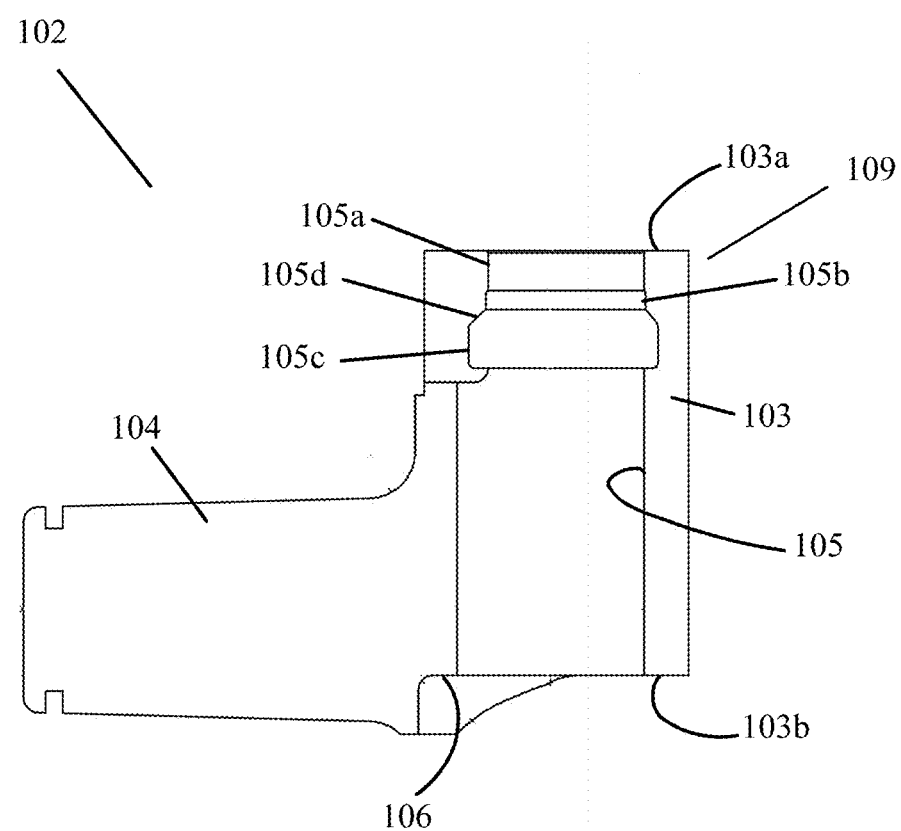
FIG. 8 shows a sectional view of FIG. 7 along line 8-8.
Figure 9:
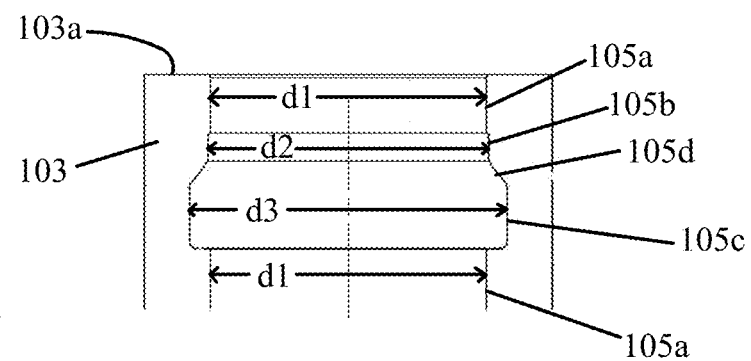
FIG. 9 shows a sectional view of FIG. 6 along line 9-9.

In the free-state of the ratchet clip 130, a diameter of the curved portion 131 is greater than the first diameter d1 and less than the third diameter d3 of the bore 105 within the body 103 of the moveable tensioner housing 102 (see FIG. 4).

It is noted that the tensioner body has a cutout 107 at the placement of the grooves (see FIGS. 5 and 8) to allow the ratchet clip legs 132 to extend outwards therefrom, such that manual manipulation of the ratchet clip 130 can take place. The cutout 107 within the body 103 of the moveable tensioner housing 102 has milled or rolled edges 108 to prevent rotation of the ratchet clip 130 within the bore 105 of the moveable tensioner housing 102 and around the hollow sleeve 110.

Engagement of the ratchet clip 130 with the circumferential teeth 111 of the hollow sleeve 110 in combination with the bore 105 of the moveable tensioner housing 102 guides the movement of the moveable tensioner housing 102 relative to the hollow sleeve 110 which is fixed, allowing the extension of the hollow sleeve 110 from the moveable tensioner housing 102.

Figure 12:
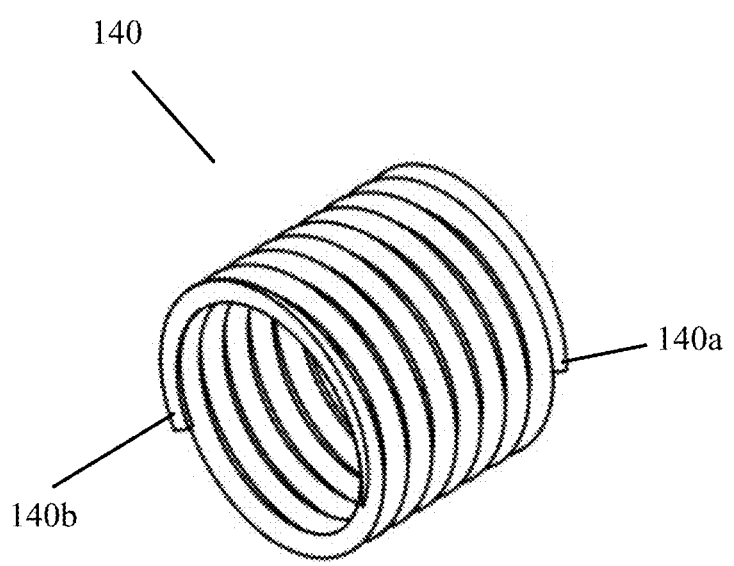
FIG. 12 shows an isometric view of a spring of the tensioner assembly.
Figure 13:
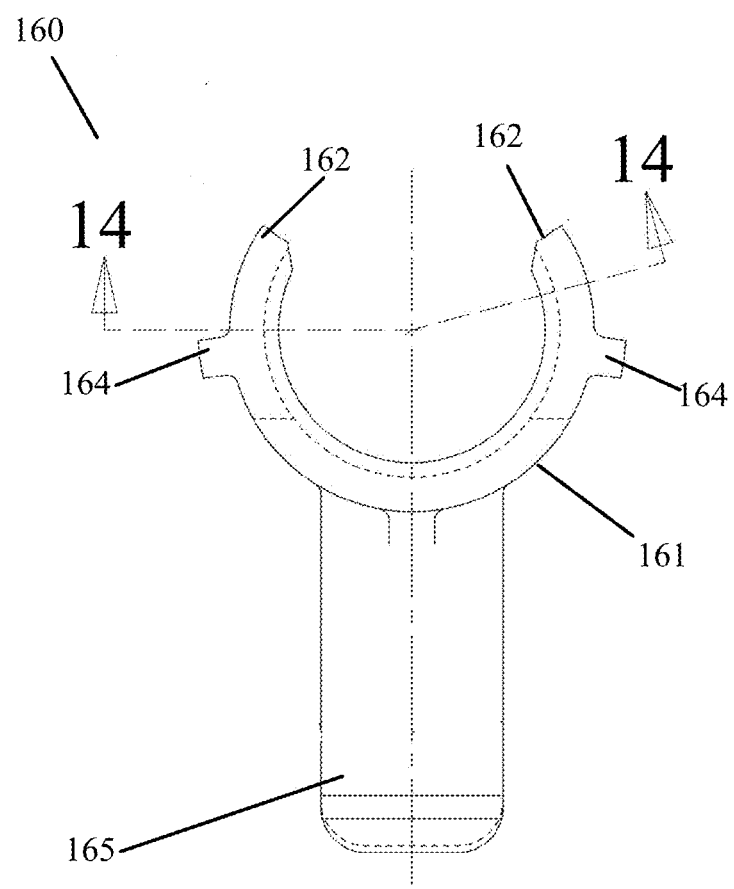
FIG. 13 shows a top view of the collar.
Figure 14:
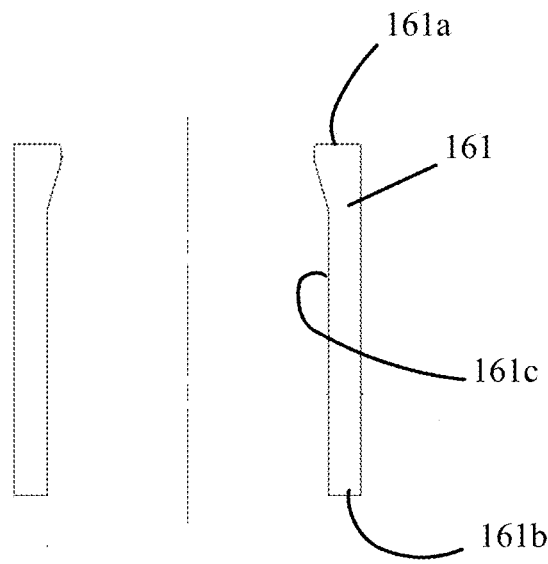
FIG. 14 shows sectional view of FIG. 13 along line 14-14.
Figure 15:
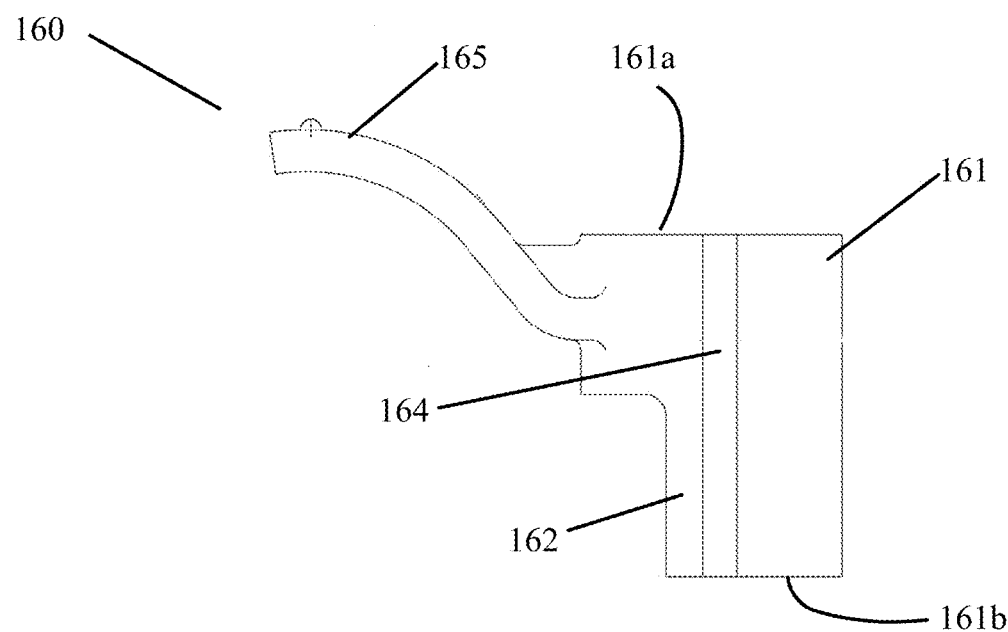
FIG. 15 shows a side view of FIG. 13.

Adjacent the second end 103b of the body 103 of the moveable tensioner housing 102 and surrounding the outer circumference 110c of the hollow sleeve 110 extending from the second end 103b of the body 103 is a spring 140. As shown in FIG. 4, a first end 140a of the spring 140 engages with a shoulder 106 of the radially extending flange 104 and a second end 140b of the spring 140 engages with an anti-rotation washer 150 engaged with the second end 110b of the hollow sleeve 110. The spring 140 surrounds the outer circumference 110c of the hollow sleeve 110 between the anti-rotation washer 150 and the second end 103b of the moveable tensioner housing 102. The spring 140 biases the moveable tensioner housing 102 towards the first end 110a of the hollow sleeve 110. The spring 140 is preferably a coil spring as shown in FIG. 12.

Figure 11:
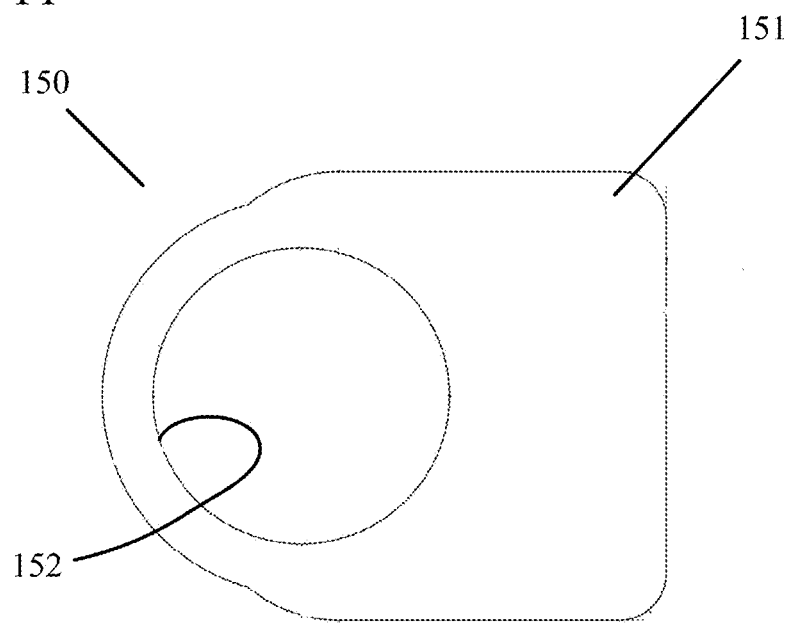
FIG. 11 shows a top view of the anti-rotation washer.

Referring to FIG. 11, the anti-rotation washer 150 has a body 151 which defines a hole 152 which receives the second end 110b of the hollow sleeve 110. The anti-rotation washer 150 is preferably press fit onto the second end 110b of the hollow sleeve 110.

Referring to FIGS. 4, and 13-17, the collar 160 has a semicircular body 161 with a first end 161a and a second end 161b and two axially extending flanges 162 extending from the first end 161a to the second end 161b. The semicircular body 161 defines an inner circumference 161c. The two axially extending flanges 162 defining a cutout 163. The cutout 163 can have a milled edge portion 166. Along each of the axially extending flanges 162 is a ridge 164.

Extending radially from the semicircular body 161 is a collar tab 165. A length is present between the collar tab 165 and the cutout 163.

Figure 16:
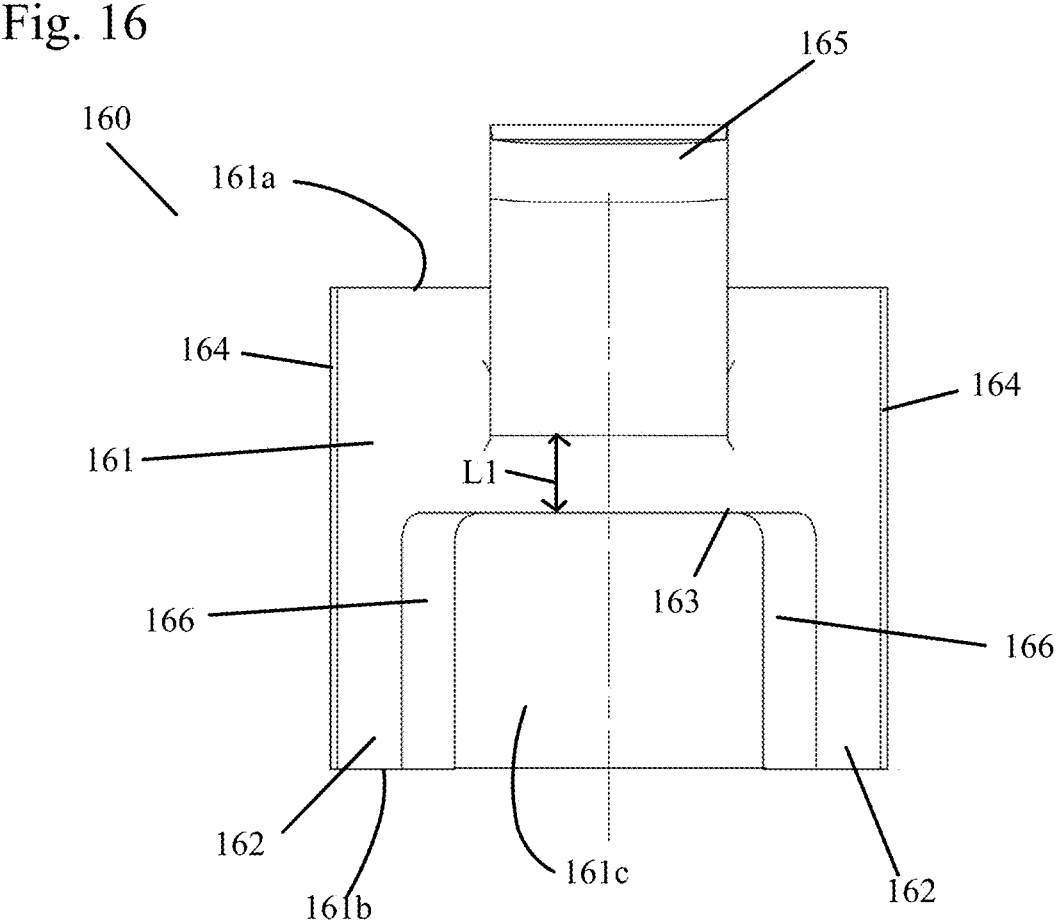
FIG. 16 shows a front view of the collar.
Figure 17:
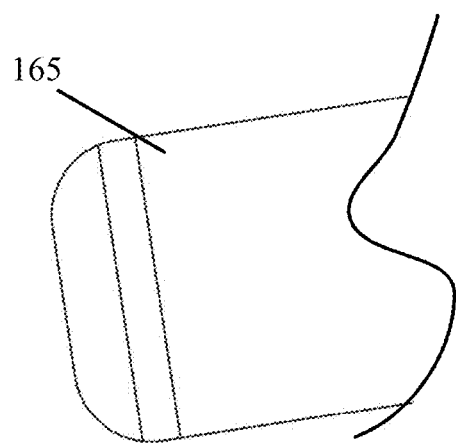
FIG. 17 shows a view of the flange of the collar.
Figure 30A:
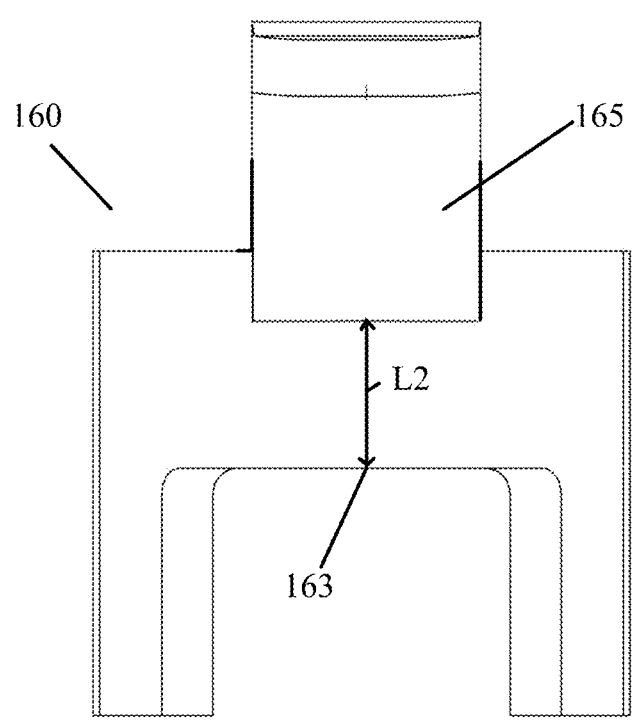
FIG. 30a-30b show the collar with different lengths of materials between the tab and the cutout.
Figure 30B:
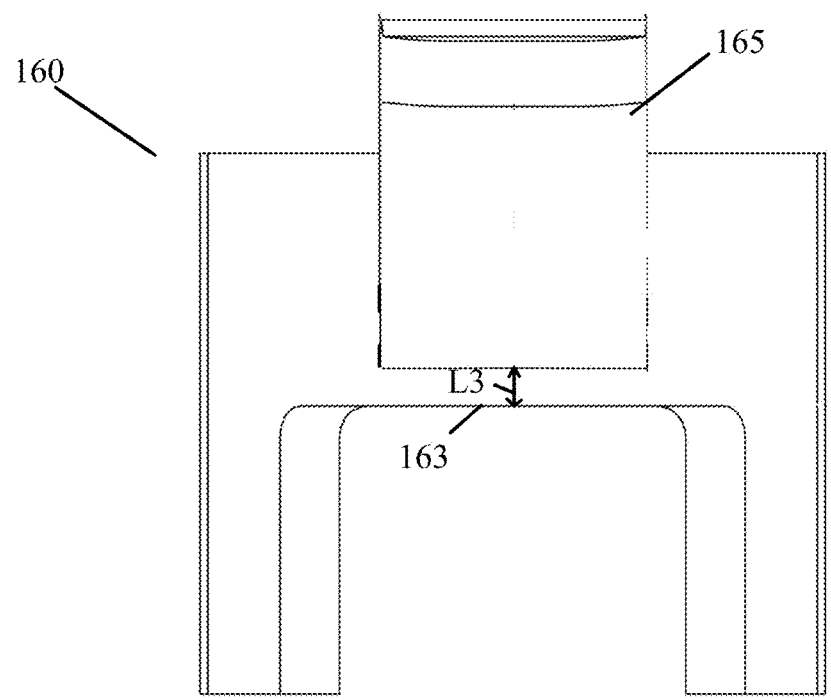

FIGS. 30a-30b show different lengths present between the collar tab 165 and the cutout 163 of the collar 160. The length L3 is less (FIG. 30b) than the length L2 (FIG. 30a) and length L1 (FIG. 16). By altering the length between the collar tab 165 and the cutout 163 of the collar, the position of the collar 160 relative to the screw rod 175 is altered, as well as the distance between the moveable housing and the anti-rotation washer 150.

For example, if the length L2 between the collar tab 165 and the cutout 163 is larger, as in FIG. 30a, the distance between the anti-rotation washer and the bottom of the bore 176 is less than if the collar with length L3 was used as in FIG. 30b. Alternatively, the length of the axially extending flanges 162 can be increased.

Figure 19:
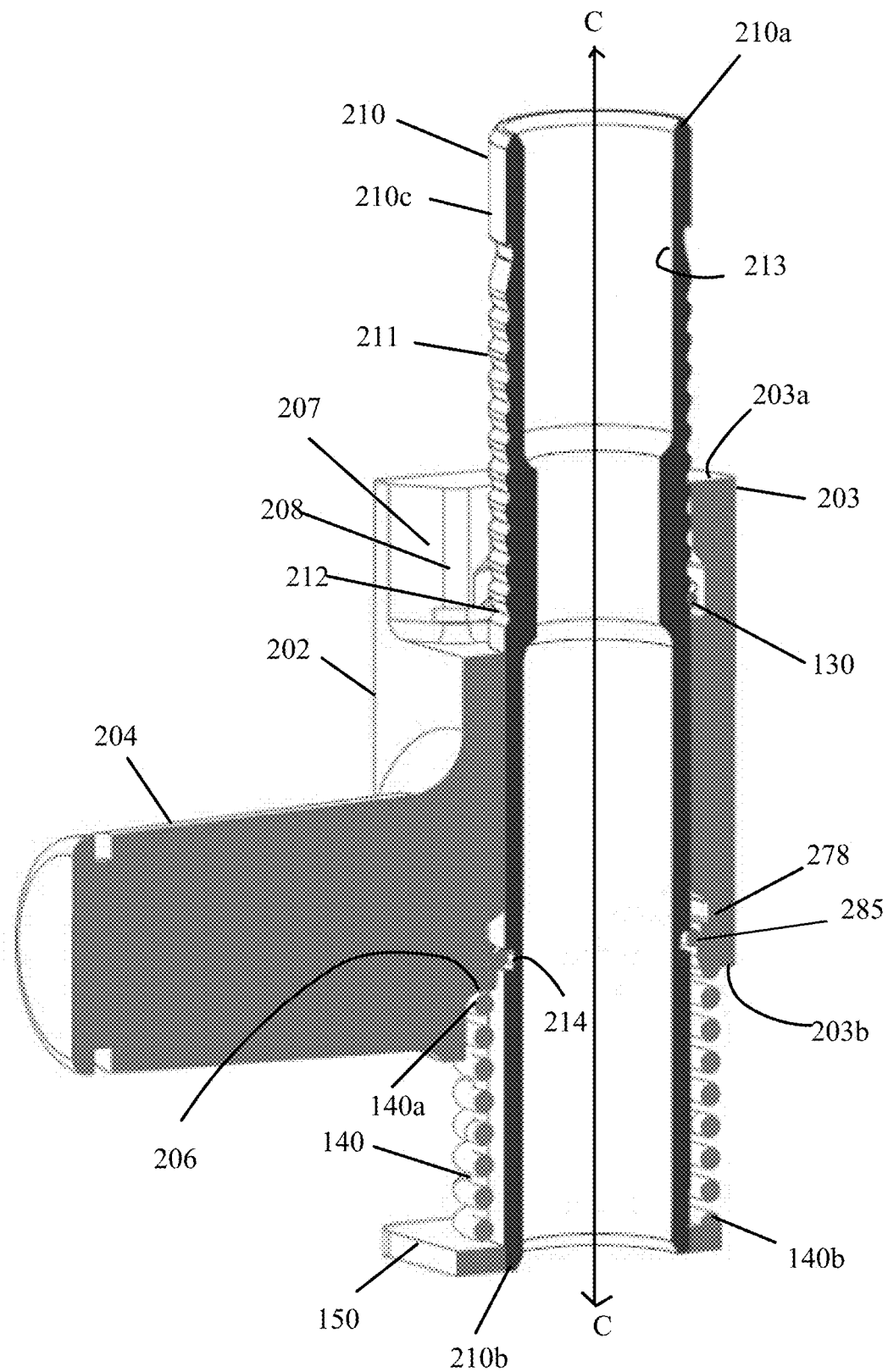
FIG. 19 shows a sectional view of the tensioner assembly of the alternate embodiment of FIG. 18.
Figure 20:
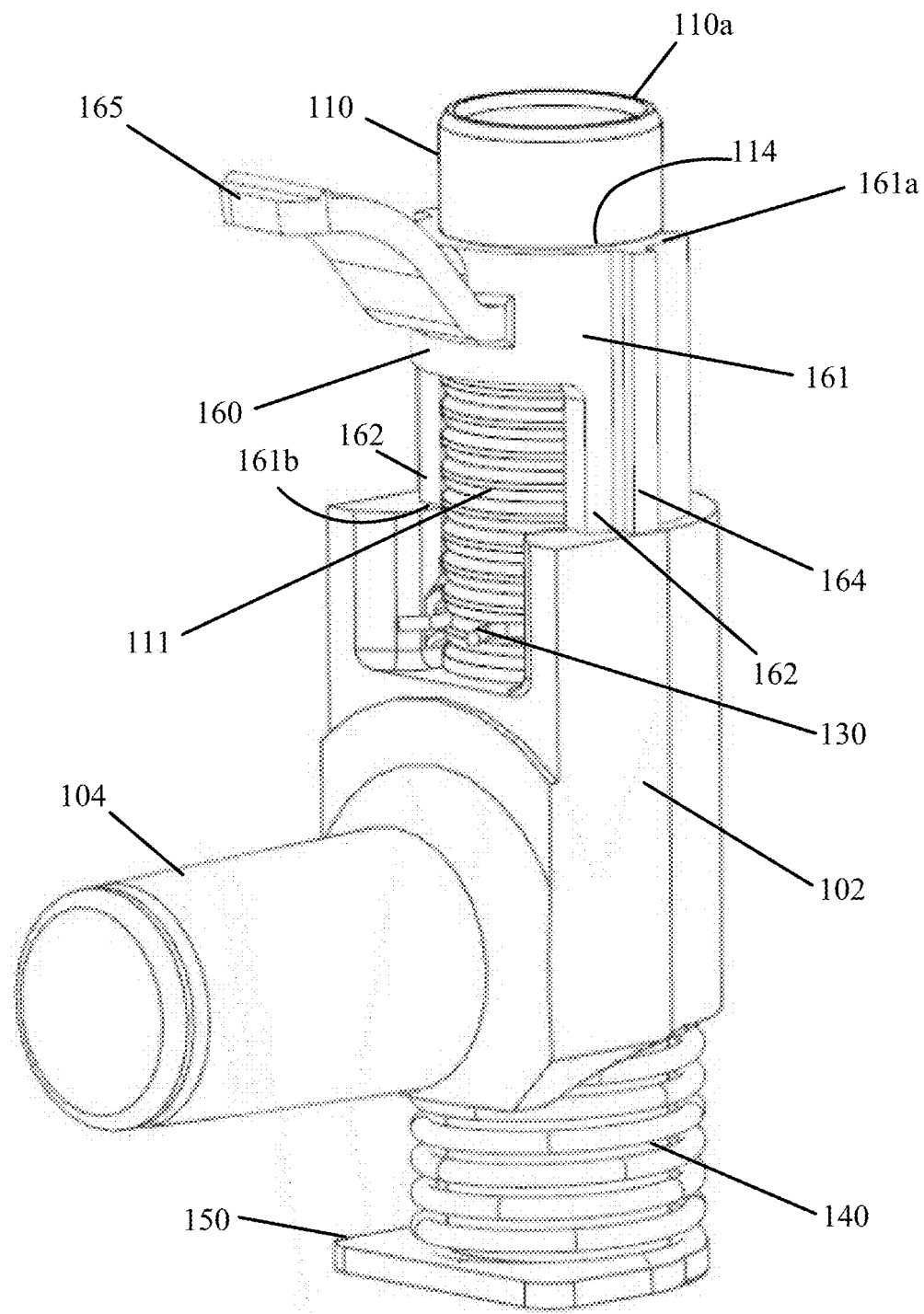
FIG. 20 shows a perspective view of the collar engaged with the movable housing.

The collar 160 replaces the function of and acts as a conventional shipping pin. The collar 160 is received at the first end 110a of the hollow sleeve 110, such that the first end 161a of semicircular body 161 of the collar 160 engages with at least the delivery groove 114 of the hollow sleeve 110. The semicircular body 161 of the collar 160 between the first end 161a and the second end 161b is adjacent at least some of the circumferential teeth 111 of the hollow sleeve 110. The two axially extending flanges 162 engage with the first end 103a of the moveable tensioner housing 102 as shown in FIG. 19.

The automatic mechanical tensioner assembly 100 has a shipping and installation position in which the automatic mechanical tensioner assembly 100 is locked into place and rendered unmovable. The shipping and installation position allows for easier installation into the chain drive system, especially in smaller package spaces. In the shipping and installation position, the collar 160 is engaged with the delivery groove 114 of the hollow sleeve 110, moving the moveable tensioner housing 102 to a position where the spring 140 is compressed.

In one embodiment, the shipping and installation position is maintained by engagement of the collar 160 with the delivery groove 114 at the first end 110a of the hollow sleeve 110 as well as the circumferential teeth 111 and stop groove 112 on the outer circumference 110c of the hollow sleeve 110.

Figure 21A:
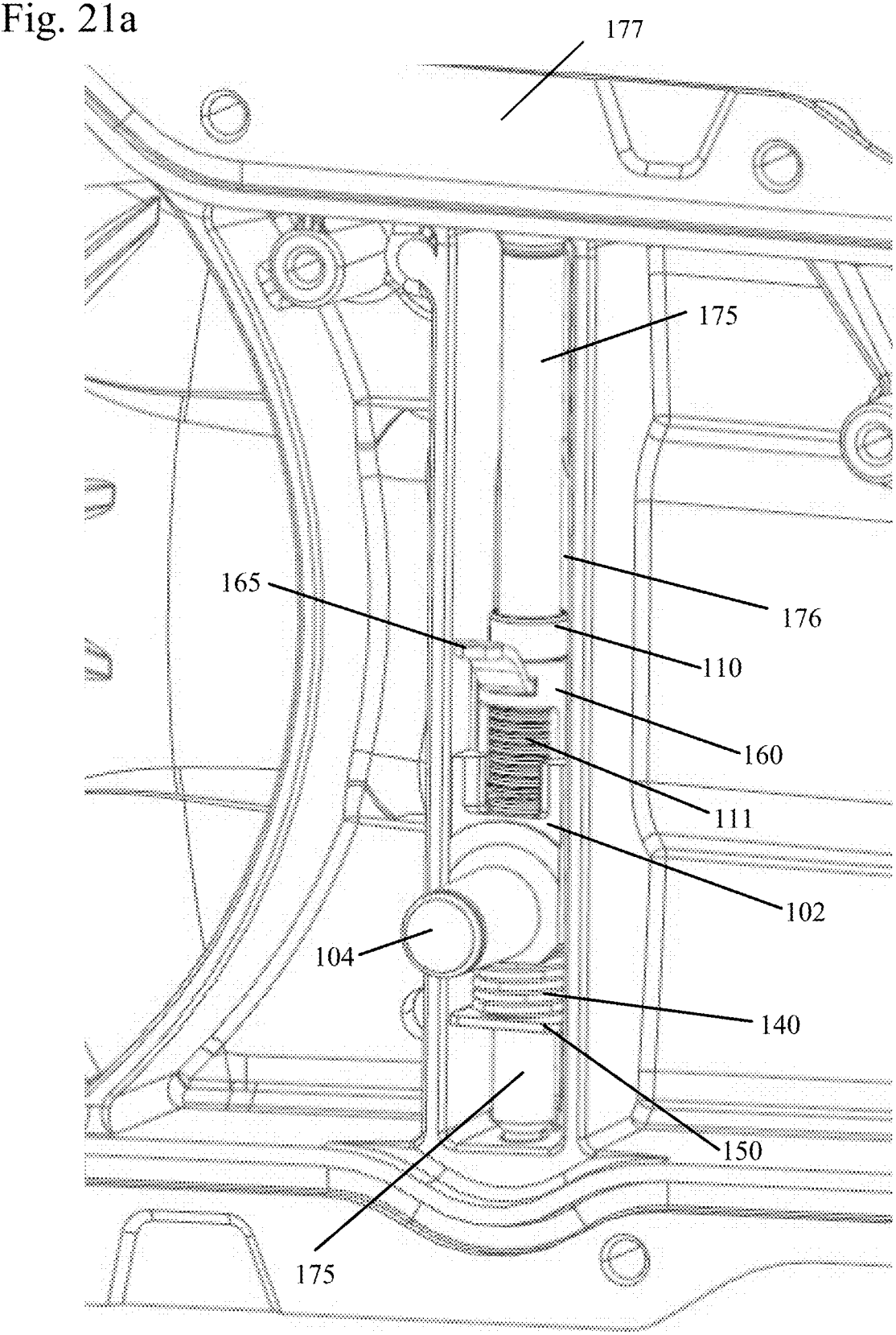
FIG. 21a shows the tensioner assembly installed within the chain drive system with the collar in place and the tensioner face removed in the shipping and installation position.
Figure 21B:
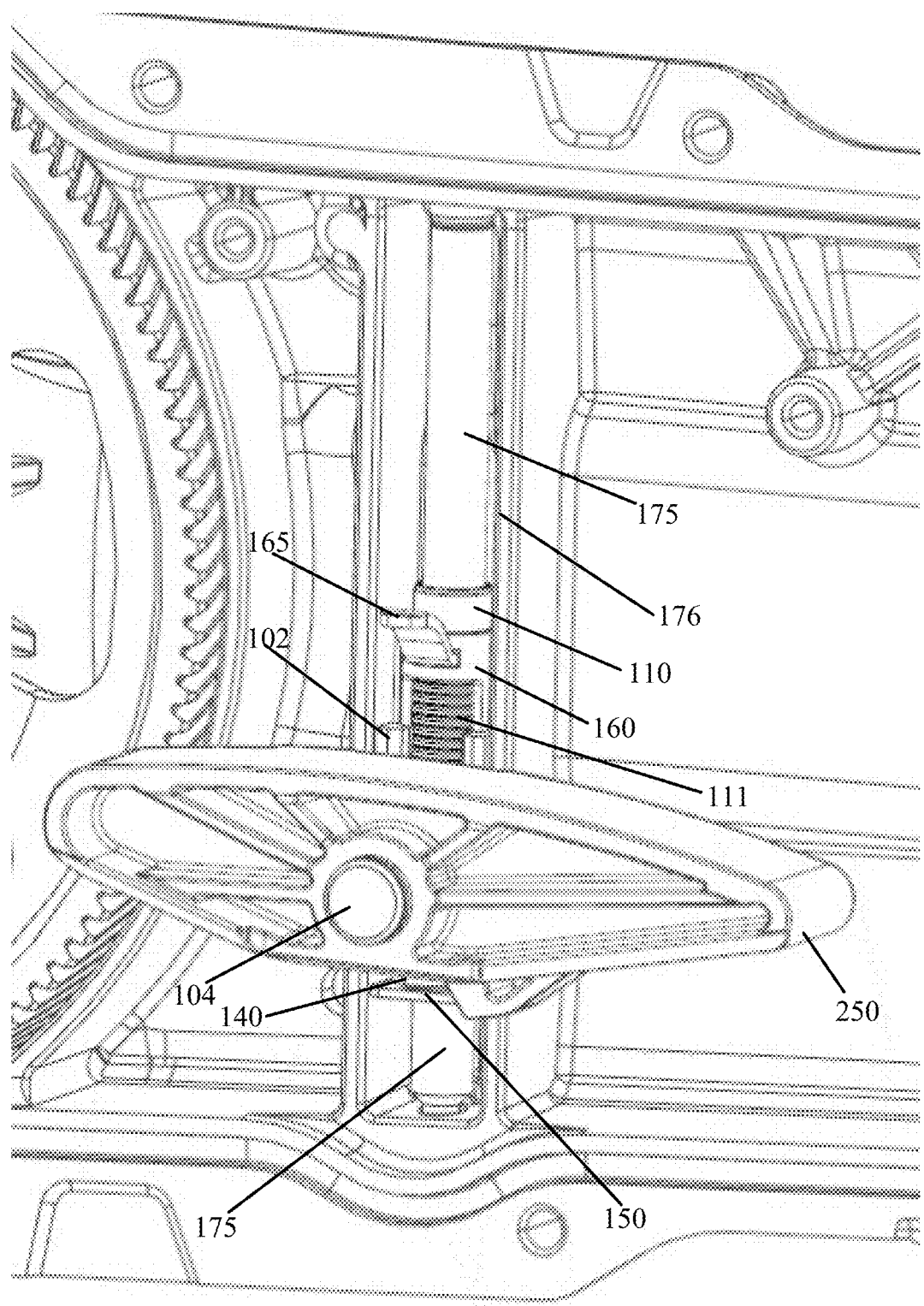
FIG. 21b shows the tensioner assembly installed within the chain drive system with the collar in place and the tensioner face in place in the shipping and installation position.

Referring to FIGS. 21a-21b, to install the automatic mechanical tensioner assembly 100 into the chain drive system, in the shipping and installation position, the automatic mechanical tensioner assembly 100 absent the tensioner face 250 is dropped into the bore 176 (see FIG. 21a) within the chain drive system. The automatic mechanical tensioner assembly 100 is assembled with the moveable tensioner housing 102 surrounding the hollow sleeve 110, the collar 160 engaged with the delivery groove 114 of the hollow sleeve 110, the spring 140 biasing the moveable tensioner housing 102 and the associated anti-rotation washer 150 receiving a second end 110b of the hollow sleeve 110. The ratchet clip 130 is engaged with the stop groove 112 of the hollow sleeve 110.

A screw rod 175 is then dropped into the bore 176 and engages within the inner bore 113 of the hollow sleeve 110 and stabilizes the automatic mechanical tensioner assembly 100 in place.

Next, the tensioner face 250 is installed onto the radially extending flange 104 of the moveable housing 102 as shown in FIG. 21b.

Figure 22A:
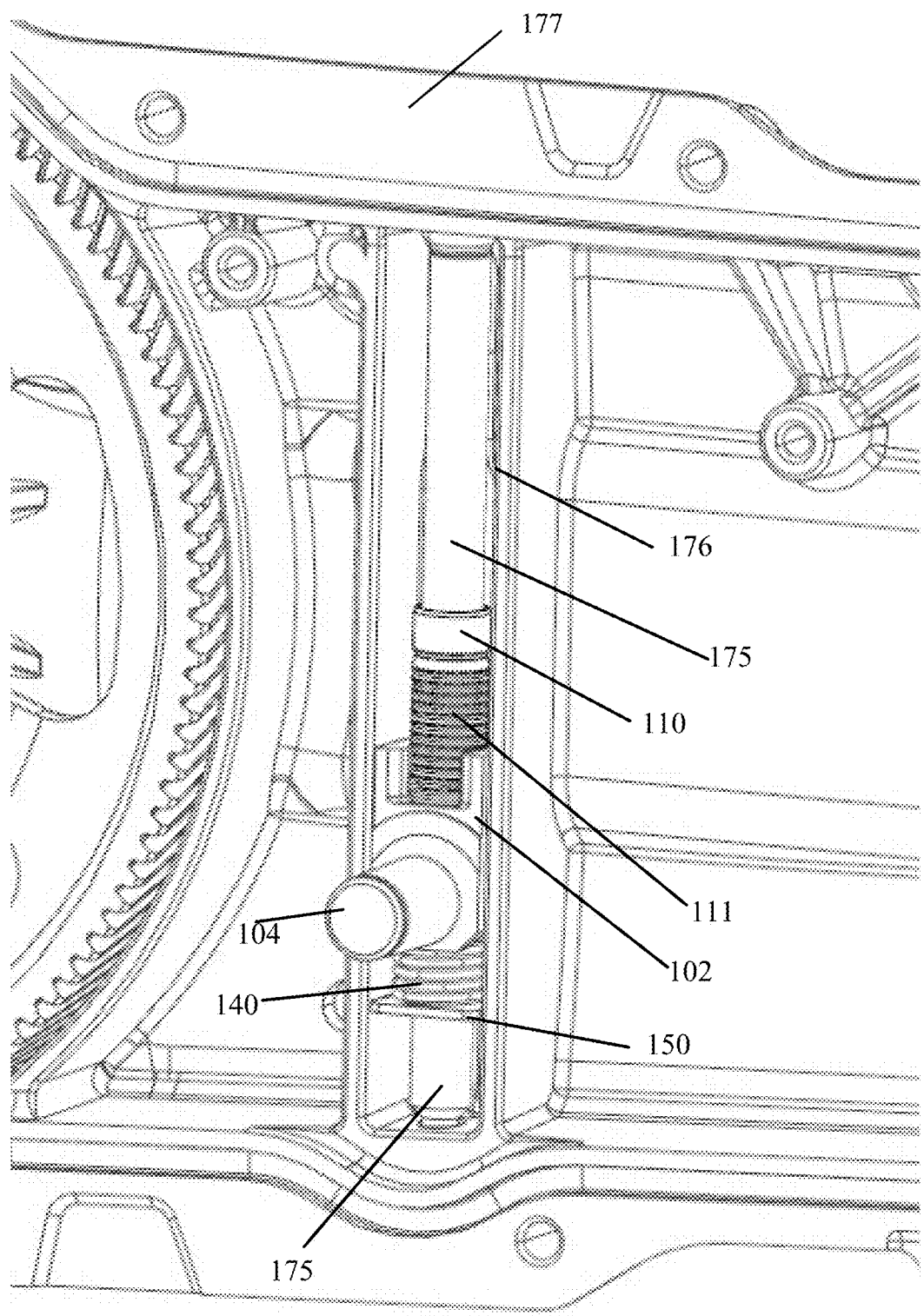
FIG. 22a shows the tensioner assembly installed within the chain drive system with the collar removed and tensioner face removed, with the tensioner assembly in a working position.
Figure 22B:
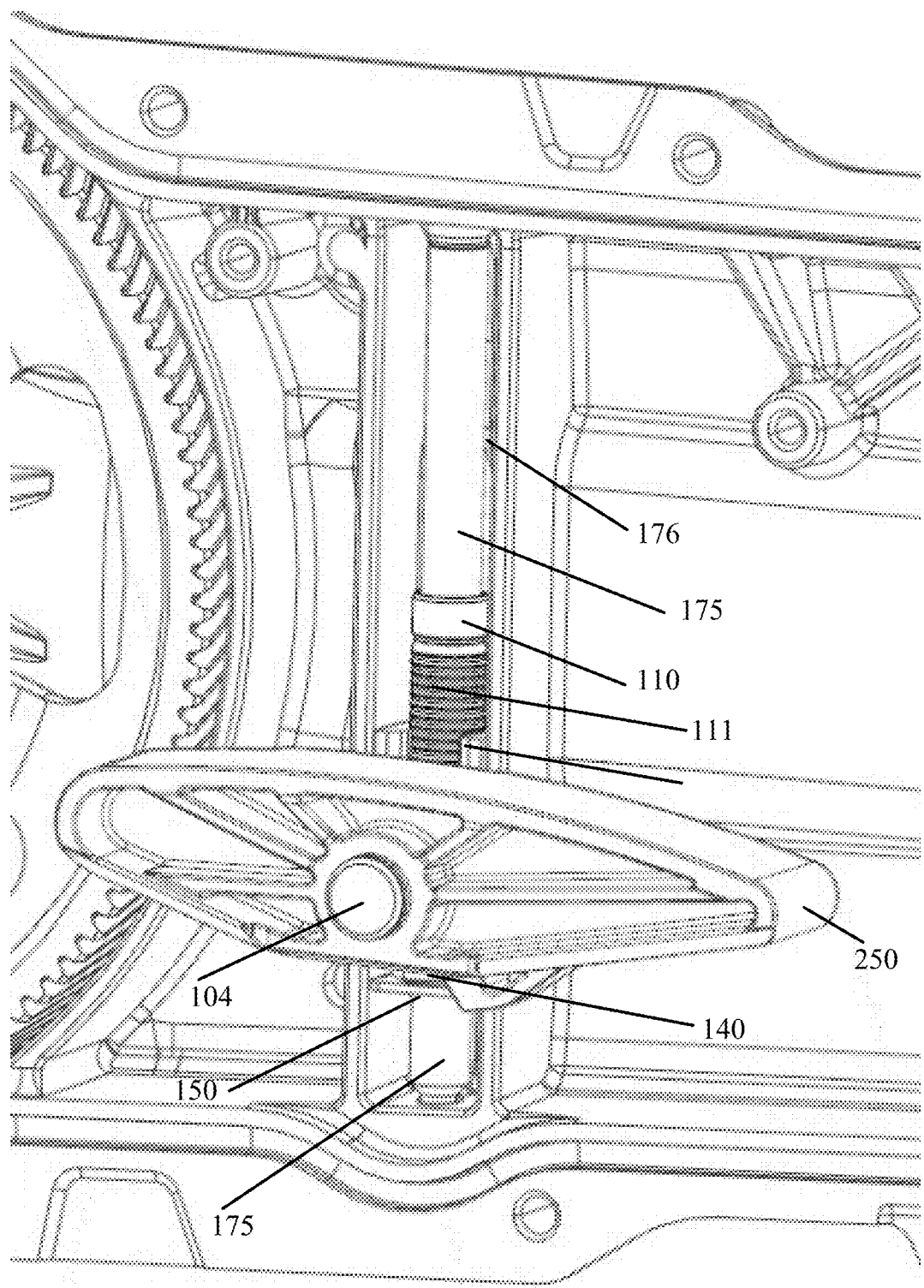
FIG. 22b shows the tensioner assembly installed within the chain drive system with the collar removed and tensioner face in place, with the tensioner assembly in the working position.

The automatic mechanical tensioner assembly 100 is then pretensioned. After the automatic mechanical tensioner assembly 100 is pretensioned, the collar 160 is removed by grasping and pulling the collar tab 165 of the collar 160 to disengage the collar 160 from the delivery groove 114 on the hollow sleeve 110, such that the moveable tensioner housing 102 is biased towards the first end 110a of the hollow sleeve 110 by the spring 140 and in a working position as shown in FIGS. 22a (tensioner face 250 removed for clarity) and 22b (tensioner face 250 in place).

Figure 18:
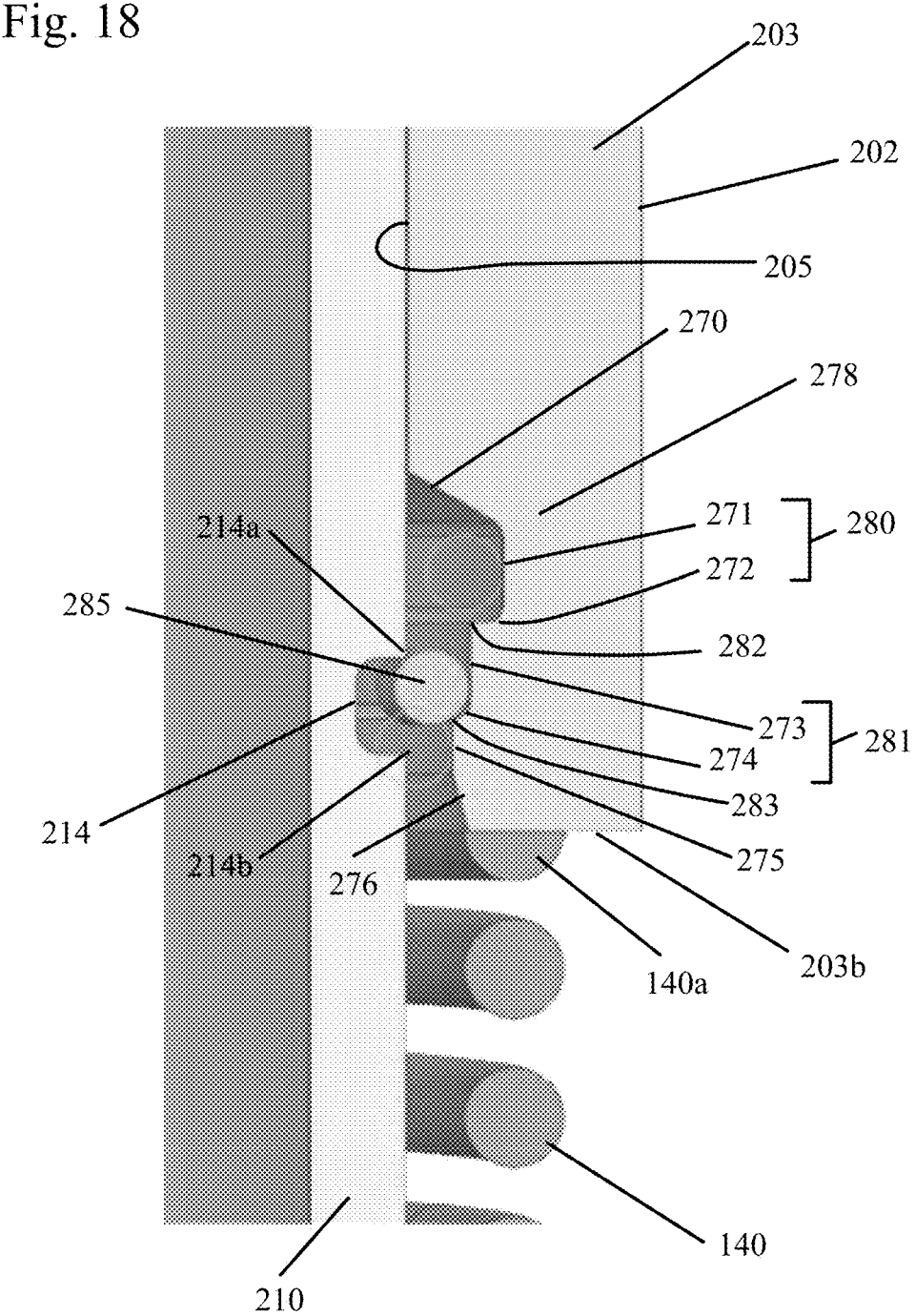
FIG. 18 shows a detailed view of the sleeve and the body of the tensioner housing of an alternate embodiment.
Figure 23:
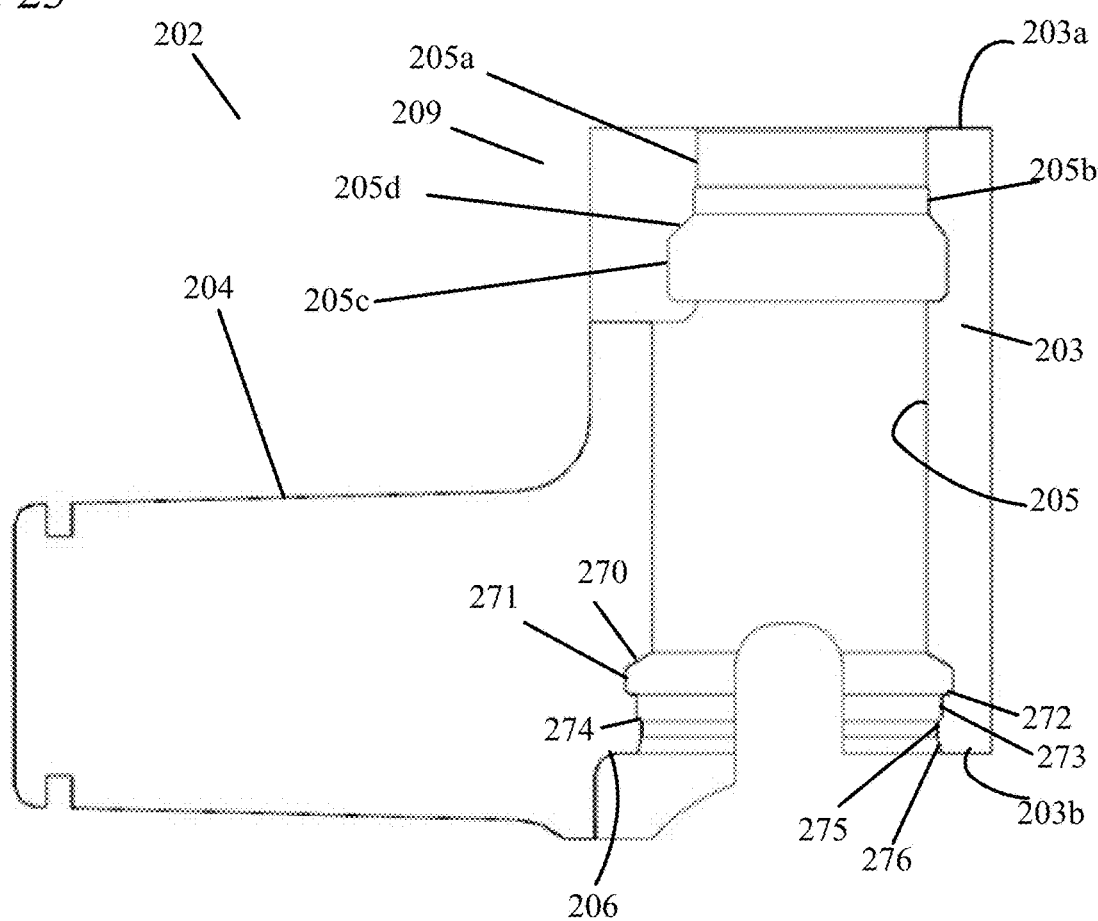
FIG. 23 shows a sectional view of the moveable housing of the alternate embodiment of FIG. 18.

Referring to FIGS. 18-19 and 23, in another embodiment, the shipping and installation position is maintained by a push to release mechanism. In this embodiment, the hollow sleeve 210 is the same as hollow sleeve 110, but the delivery groove 114 is no longer present and the hollow sleeve 210 includes an installation groove 214 having a first installation edge 214a and a second installation edge 214b is proximate to a second end 210b of the hollow sleeve 210 where a retaining clip 285 engages a shipping installation housing groove 278.

The hollow sleeve 210 has a first end 210a and a second end 210b with a series of circumferential teeth 211 on an outer circumference 210c thereof extending a length between the first end 210a and the second end 210b. At least one of the circumferential teeth is a stop groove 212. The circumferential teeth 211 are formed and spaced to receive a ratchet clip 130. The circumferential teeth 211 and stop groove 212 are angled towards the second end 210b of the hollow sleeve 210. In this embodiment, the circumferential teeth 211 and the stop groove 212 are proximate to the first end 210a of the hollow sleeve 210. The hollow sleeve 210 defines an inner bore 213 with at least one diameter along a central axis C-C. The inner bore 213 of the hollow sleeve 210 receives a threaded screw rod (not shown).

A moveable tensioner housing 202 has a body 203 connected to a radially extending flange 204. The body 203 has a first end 203a and a second end 203b and defines a bore 205 coaxial to the hollow sleeve along central axis C-C and surrounds at least a portion of the hollow sleeve. The bore 205 extends from the first end 203a to the second end 203b of the body 203. The radially extending flange 204 is perpendicular to the bore 205 defined by the body 203 of the moveable tensioner housing 202 and receives a tensioner face (not shown). Within the bore 205 of the body 203 are ratchet clip grooves 209 which include a series of varying diameters depending on the portion of the bore 205. The ratchet clip grooves 209 includes the first portion 205a at the first end 203a, the second portion 205b, the transition portion 205d and the third portion 205c. As in the first embodiment and shown in 9, a first diameter d1 of the bore 205 is present at a proximal end of the bore and corresponds to a first portion 205a. Adjacent the first portion 205a is a second portion 205b with a second diameter d2. The second portion 205b is connected to a third portion 205c by a transition portion 205d. The third portion 205c has a third diameter d3 which is greater than the first and second diameters d1, d2. After the third diameter d3, the bore returns to the first diameter d1 and a first portion 205a. It is noted that the second diameter d2 is greater than the first diameter d1 and smaller than the third diameter d3.

A shipping installation housing groove 278 is formed within the bore 205 of the moveable tensioner housing body 203.

The shipping installation housing groove 278 is formed of a first angled portion 270, connected to a first undercut groove 280, a first edge 282, a second undercut groove 281, a second edge 283, a fourth portion 275, and a second angled portion 276. The first angled portion 270 is connected to second portion 271 which is connected to a first radiused seat portion 272, which can receive the retaining clip 285 when the retaining clip 285 is disengaged from the delivery groove 114. The second portion 271 and the first radiused seat portion 272 form a first undercut groove 280. Between the first undercut groove 280 and the third portion 273 is a first edge 282. The first radiused seat portion 272 is connected to a third portion 273. The third portion 273 is connected to a second radiused seat portion 274. The third portion 273 and the second radiused seat portion 274 form a second undercut groove 281. Between the second undercut groove 281 and the fourth portion 275 is a second installation edge 283. The second radiused seat portion 274 is connected to a fourth portion 275, which connects to a second angled portion 276 aligned with the second end 203b of the moveable tensioner housing body 203. The second portion 271, the third portion 273 and the fourth portion 275 are preferably parallel to the hollow sleeve 210.

In the free-state of the ratchet clip 130 or the retaining clip 285, a diameter of the curved portion 131 is greater than the first diameter d1 and less than the third diameter d3 of the bore 205 within the body 203 of the moveable tensioner housing 202.

It is noted that the tensioner body has a cutout 207 at the placement of the grooves (see FIGS. 5 and 8) to allow the ratchet clip legs 132 to extend outwards therefrom, such that manual manipulation of the ratchet clip 130 can take place. The cutout 207 within the body 203 of the moveable tensioner housing 202 has milled or rolled edges 208.

Engagement of the ratchet clip 130 with the circumferential teeth 211 of the hollow sleeve 210 in combination with the bore 205 of the moveable tensioner housing 202 guides the movement of the moveable tensioner housing 202 relative to the hollow sleeve 210 which is fixed, allowing the extension of the hollow sleeve 210 from the moveable tensioner housing 202.

Adjacent the second end 203b of the body 203 of the moveable tensioner housing 202 and surrounding the outer circumference 210c of the hollow sleeve 210 extending from the second end 203b of the body 203 is a spring 140.

As shown in FIG. 19, a first end 140a of the spring 140 engages with a shoulder 206 of the radially extending flange 204 and a second end 140b of the spring 140 engages with an anti-rotation washer 150 engaged with the second end 210b of the hollow sleeve 210. The spring 140 surrounds the outer circumference 210c of the hollow sleeve 210 between the anti-rotation washer 150 and the second end 203b of the moveable tensioner housing 202. The spring 140 biases the moveable tensioner housing 202 towards the first end 210a of the hollow sleeve 210. The spring 140 is preferably a coil spring as shown in FIG. 12.

Referring to FIG. 11, the anti-rotation washer 150 has a body 151 which defines a hole 152 which receives the second end 210b of the hollow sleeve 210. The anti-rotation washer 150 is preferably press fit onto the second end 210b of the hollow sleeve 210.

In the shipping and installation position, the retaining clip 285 is present between a first installation edge 214a of the installation groove 214 on the hollow sleeve 210 and a second installation edge 283 of the second undercut groove 281 in the moveable tensioner housing 202, such that the first installation edge 214a and the second installation edge 283 engage with the ratchet clip 130 and wedges. With the retaining clip 285 in this position, the moveable tensioner housing 202 is locked in place and compresses spring 140.

After installation of the automatic mechanical tensioner assembly 100 into the chain drive system in the shipping and installation position, the moveable tensioner housing 202 is moved such that the retaining clip 285 can travel along the bore 205 of the moveable tensioner housing 202 and move into the first undercut groove 280, where the moveable tensioner housing 202 can slide relative to the hollow sleeve 210 without the interference of the retaining clip 285.

To install the automatic mechanical tensioner assembly 200 into the chain drive system, in the shipping and installation position, the automatic mechanical tensioner assembly 200 absent the tensioner face 250 is dropped into the bore 176 within the chain drive system. The automatic mechanical tensioner assembly 200 is assembled with the moveable tensioner housing 202 surrounding the hollow sleeve 210, the collar 160 engaged with the installation groove 214 of the hollow sleeve 210, the spring 140 biasing the moveable tensioner housing 202 and the associated anti-rotation washer 150 receiving a second end 210b of the hollow sleeve 210. The ratchet clip 130 is engaged with the stop groove 212 of the hollow sleeve 210. The retaining clip 285 is engaged between the installation groove 214 and the second undercut groove 281.

A screw rod 175 is then dropped into the bore 176 and engages within the inner bore 213 of the hollow sleeve 210 and stabilizes the automatic mechanical tensioner assembly 200 in place.

Next, the tensioner face 250 is installed onto the radially extending flange 204 of the moveable tensioner housing body 203.

The automatic mechanical tensioner assembly 200 is then pretensioned. After the automatic mechanical tensioner assembly 200 is pretensioned, the collar 160 is removed by grasping and pulling the collar tab 165 of the collar 160 to disengage the collar 160 from the installation groove 214 on the hollow sleeve 210. After the collar 160 is disengaged from the installation groove 214, the hollow sleeve is pushed towards the anti-rotation washer 150, such that the retaining clip 285 slips into the installation groove 214 and travels up to and is deposited into the first undercut groove 280, where the retaining clip 285 remains when the automatic mechanical tensioner assembly 200 is in the working position and tensioning the chain or belt.

Figure 24:
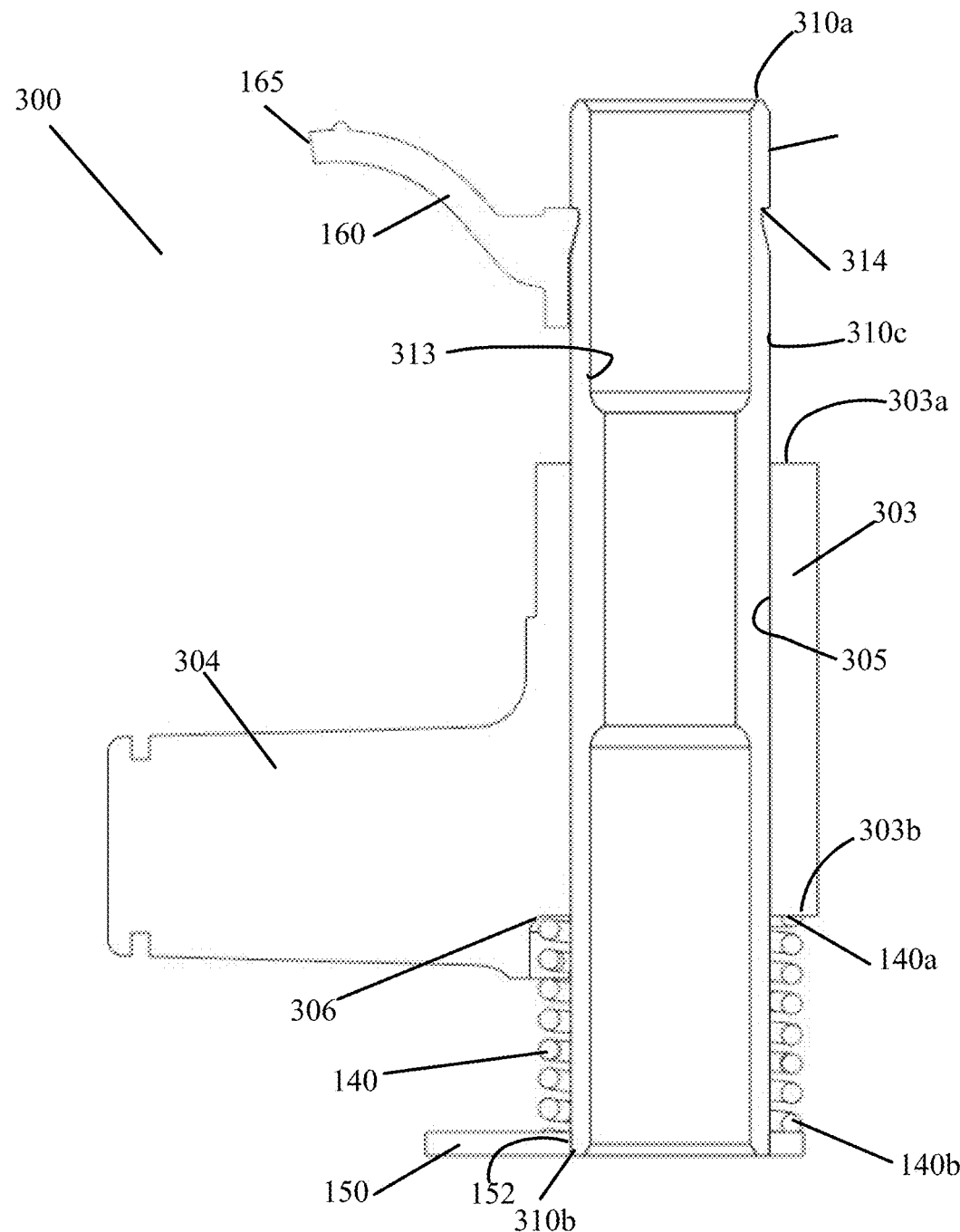
FIG. 24 shows a sectional view of another alternative embodiment of a tensioner assembly in which the hollow sleeve does not have a plurality of grooves.
Figure 25:
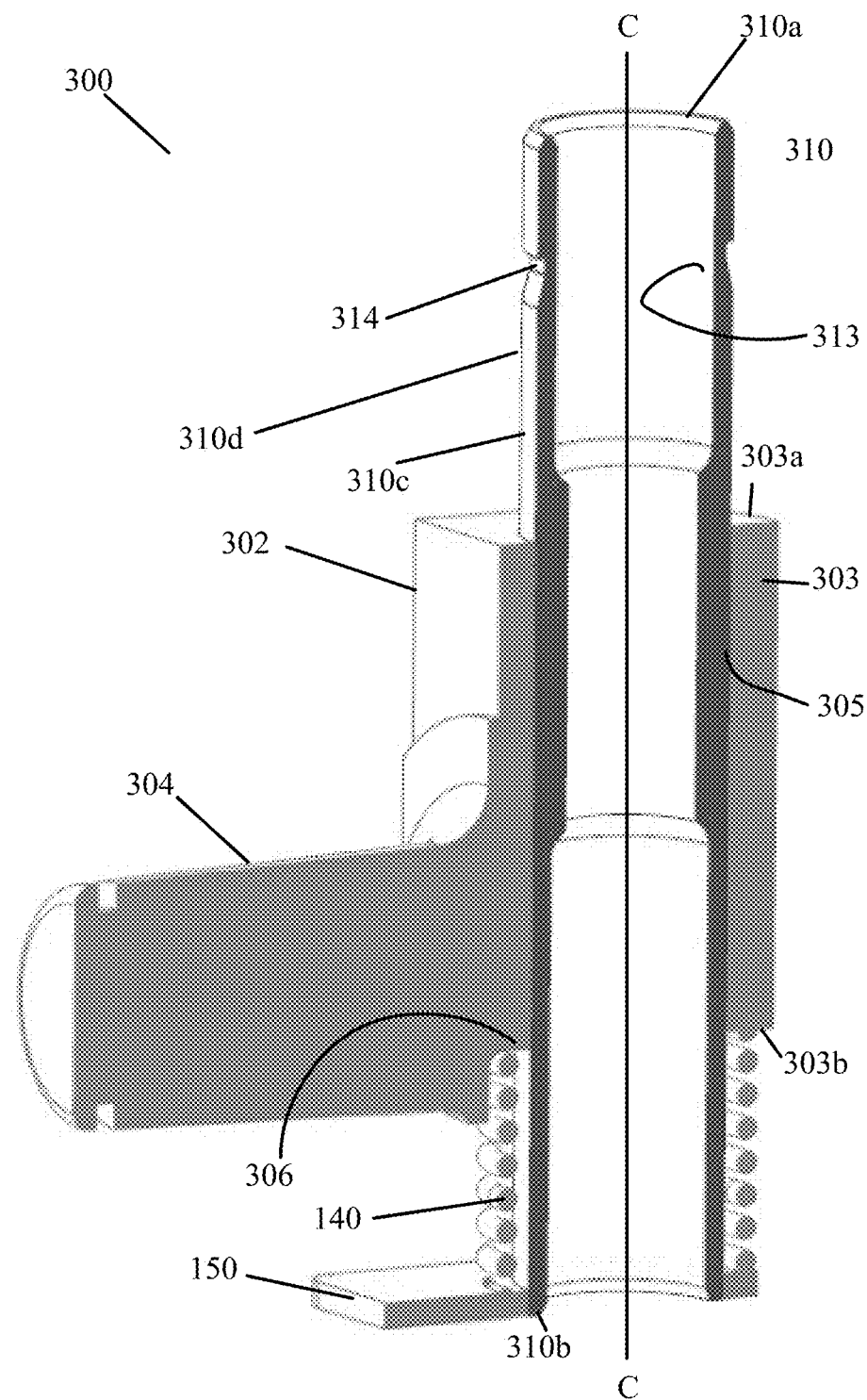
FIG. 25 shows a perspective view of FIG. 24.

FIGS. 24 and 25 show a sectional view of another alternative embodiment of the automatic mechanical tensioner assembly 300 in which the hollow sleeve 310 does not have a plurality of grooves. The hollow sleeve 310 has a body 310d with a first end 310a, a second end 310b and an outer circumference 310c. In this embodiment, a delivery groove 314 is proximate to the first end 310a, but otherwise no additional grooves are present on the outer circumference 310c of the body 310d of the hollow sleeve 310. The delivery groove 314 receives a collar 160. The hollow sleeve 310 defines an inner bore 313 with at least one diameter along a central axis C-C. The inner bore 313 of the hollow sleeve 310 receives a threaded screw rod 175.

A moveable tensioner housing 302 has a body 303 connected to a radially extending flange 304. The body 303 has a first end 303a and a second end 303b and defines a bore 305 coaxial to the hollow sleeve 310 along central axis C-C and surrounds at least a portion of the hollow sleeve 310. The bore 305 extends from the first end 303a to the second end 303b of the body 303. The radially extending flange 304 is perpendicular to the bore 305 defined by the body 303 of the moveable tensioner housing 302 and receives a tensioner face (not shown).

Adjacent the second end 303b of the body 303 of the moveable tensioner housing 302 and surrounding the outer circumference 310c of the hollow sleeve 310 extending from the second end 303b of the body 303 is a spring 140. A first end 140a of the spring 140 engages with a shoulder 306 of the radially extending flange 304 and a second end 140b of the spring 140 engages with an anti-rotation washer 150 engaged with the second end 310b of the hollow sleeve 310. The spring 140 surrounds the outer circumference 310c of the hollow sleeve 310 between the anti-rotation washer 150 and the second end 303b of the moveable tensioner housing 302. The spring 140 biases the moveable tensioner housing 302 towards the first end 310a of the hollow sleeve 310. The spring 140 is preferably a coil spring as shown in FIG. 12.

Figure 26A:
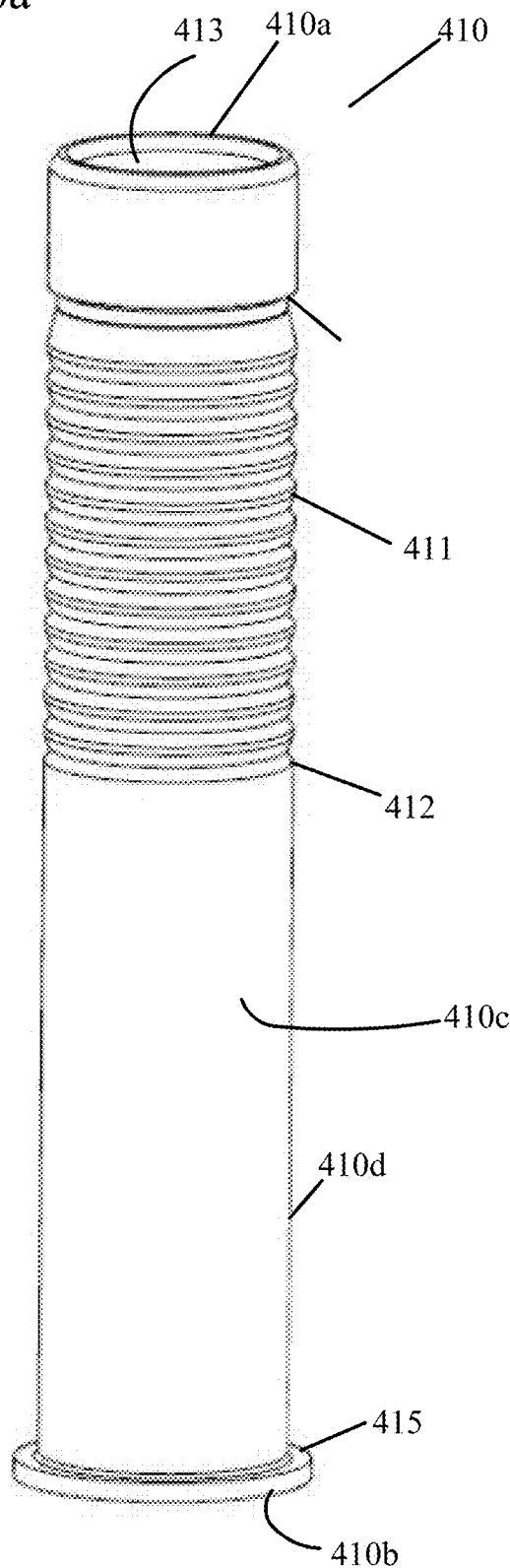
FIG. 26a shows an alternate hollow sleeve with a flange.

FIG. 26a shows an alternate hollow sleeve with a flange. The hollow sleeve 410 has a body 410d with a first end 410a, a second end 410b and an outer circumference 410c. The outer circumference 410c has a plurality of grooves 411 and a delivery groove proximal to the first end 410a. The delivery groove 414 receives a collar 160. The hollow sleeve 410 defines an inner bore 413. The inner bore 413 of the hollow sleeve 410 receives a threaded screw rod 175. At the second end 410b of the hollow sleeve is a flange 415. The hollow sleeve 410 can replace hollow sleeve 110, 210.

Figure 26B:
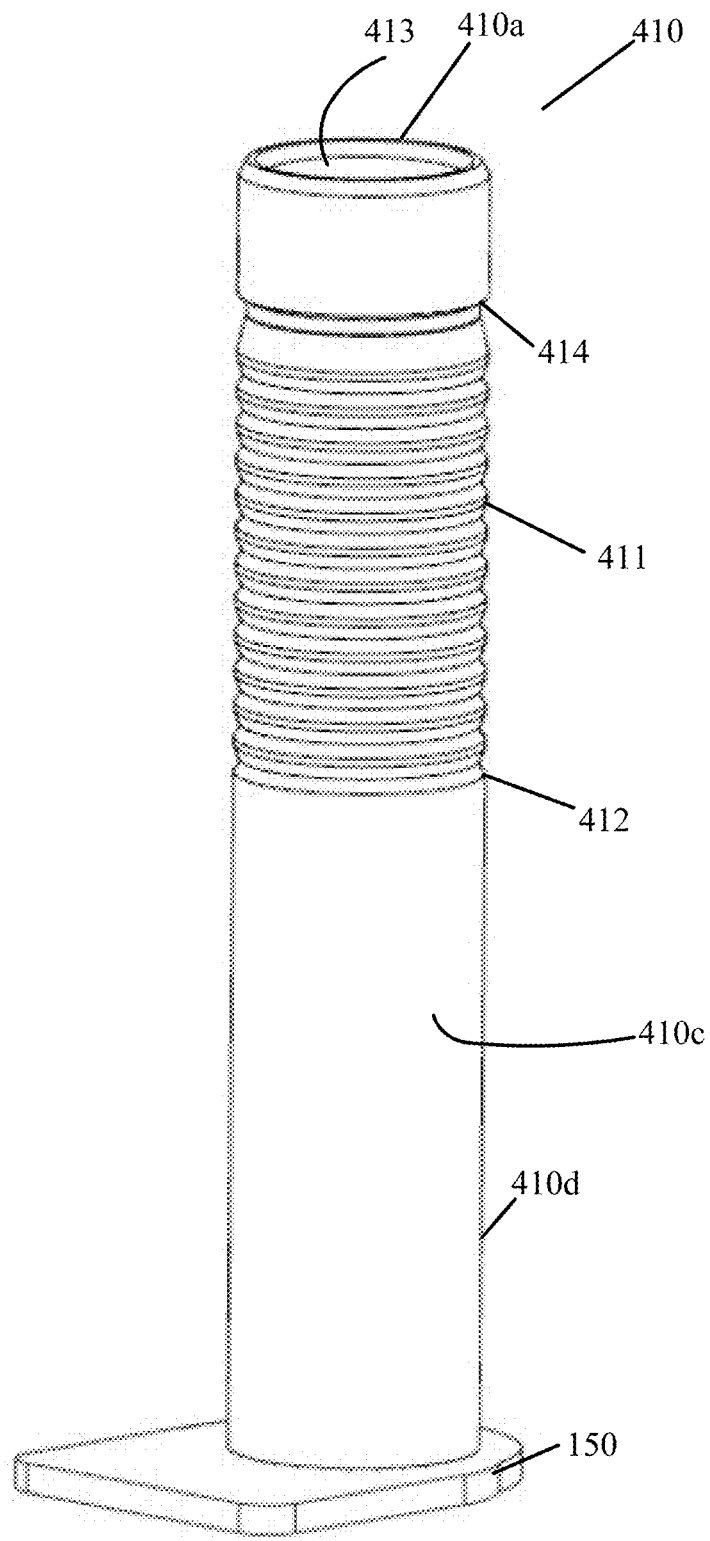
FIG. 26b shows the alternate hollow sleeve with a flange with an anti-rotation washer.

FIG. 26b shows the alternate hollow sleeve of FIG. 26a with an anti-rotation washer 150 used adjacent and in conjunction with the flange 415.

Figure 27:
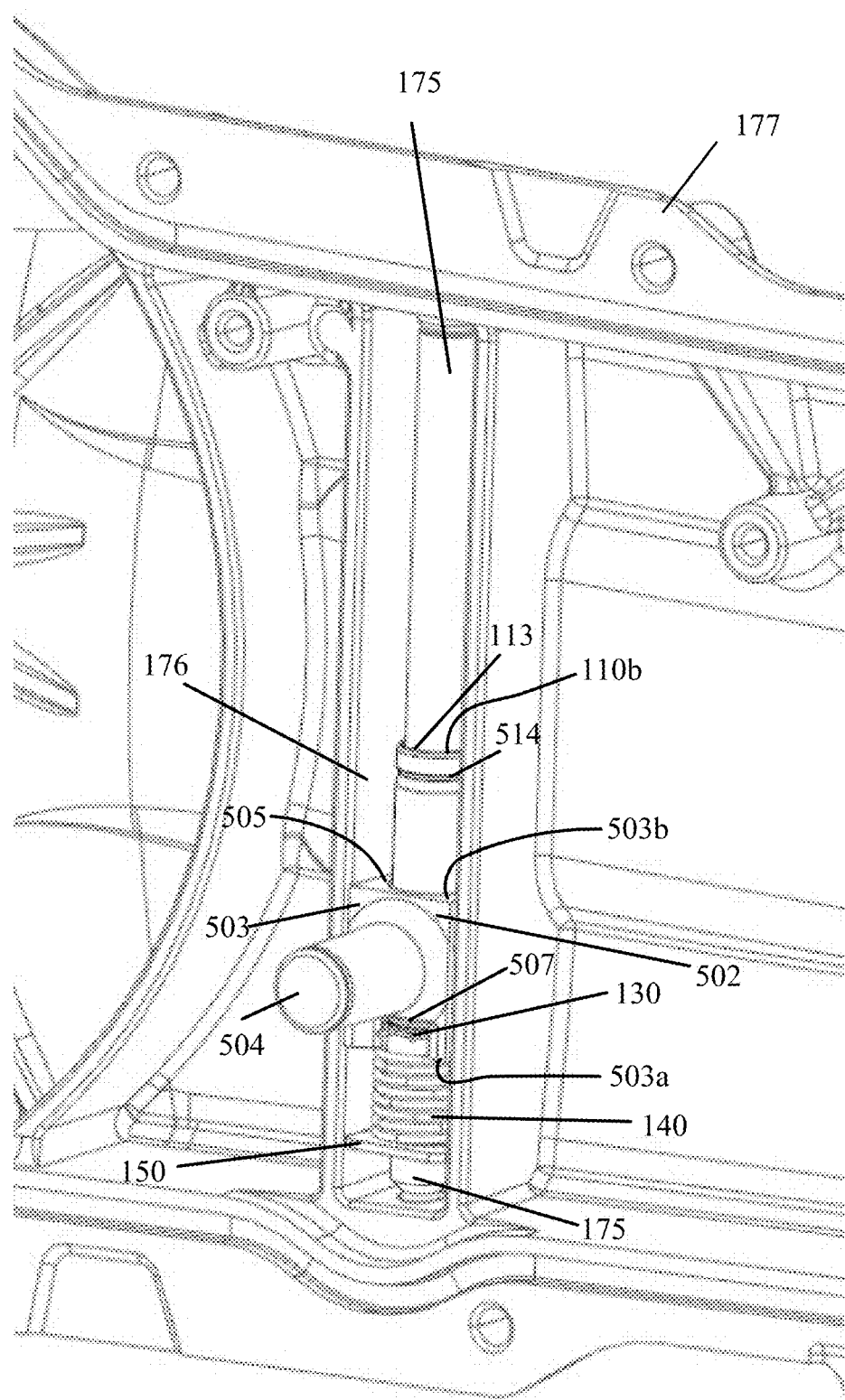
FIG. 27 shows the tensioner assembly installed within the chain drive system with the collar removed and tensioner face removed, with the tensioner assembly in a working position, with the cutout of the moveable housing rotated ninety degrees.

FIG. 27 shows the tensioner assembly installed within the chain drive system with the collar removed and tensioner face removed, with the tensioner assembly in a working position, with the cutout 507 of the moveable housing 502 rotated ninety degrees relative to the moveable tensioner housing 102. In this embodiment, the hollow sleeve 110 is rotated such that the first end 110a is adjacent and proximal to the anti-rotation washer 150. In this embodiment, the delivery groove 514 is moved to the second end 110b for accommodating the collar 160. The moveable housing 502 has a body 503 with a first end 503a and a second end 503b defining cutout 507 at the second end 503b and a bore 505. The body 503 is connected to a radially extending flange 504 for receiving a tensioner face (not shown). In this embodiment, the radially extending flange 504 is in the same plane as the cutout 507.

Within the bore 176 of the chain drive system is a rod 175 received within an inner bore 113 of the hollow sleeve 110. Surrounding the hollow sleeve 110 is the moveable housing 502. Engaged with the circumferential teeth 111 within the cutout 507 is a ratchet clip. Spring 140 is present between the first end 503a of the body 503 and the anti-rotation washer 150.

Figure 28:
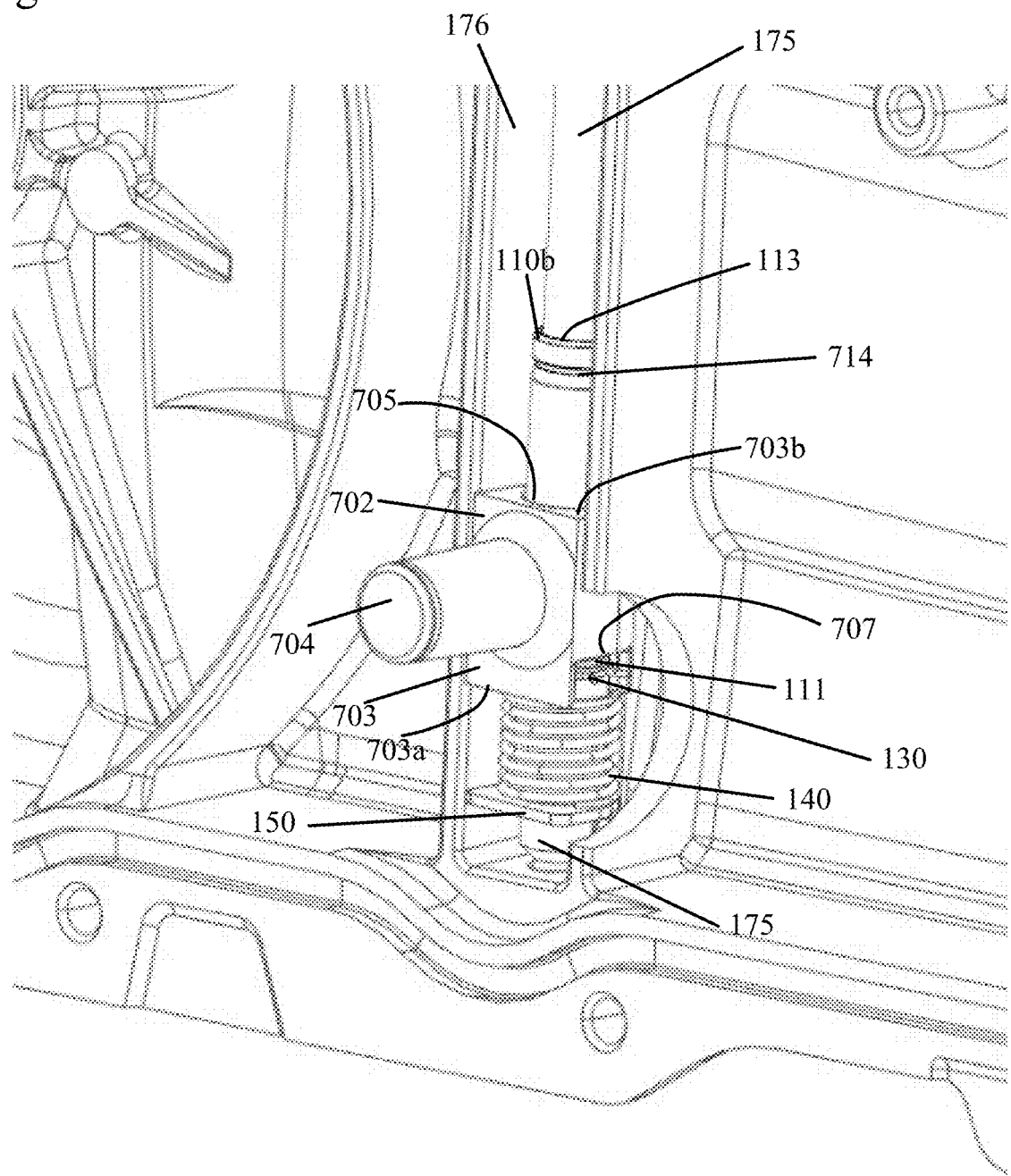
FIG. 28 shows tensioner assembly installed within the chain drive system with the collar removed and tensioner face removed, with the tensioner assembly in a working position, with the cutout of the moveable housing proximal to the anti-rotation washer or the spring.

FIG. 28 shows tensioner assembly installed within the chain drive system with the collar removed and tensioner face removed, with the tensioner assembly in a working position, with the cutout 707 of the moveable housing 702 proximal to the anti-rotation washer 150 or the spring 140. In comparison to the moveable housing 502, the cutout 707 is rotated 90 degrees.

In this embodiment, the hollow sleeve 110 is rotated such that the first end 110a is adjacent and proximal to the anti-rotation washer 150. The delivery groove 714 is moved to the second end 110b for accommodating the collar 160. The moveable housing 702 has a body 703 with a first end 703a and a second end 703b defining cutout 707 at the second end 703b and a bore 705. The body 703 is connected to a radially extending flange 704 for receiving a tensioner face (not shown). In this embodiment, the radially extending flange 704 and the cutout 707 are in different planes.

Within the bore 176 of the chain drive system is a screw rod 175 received within an inner bore 113 of the hollow sleeve 110. Surrounding the hollow sleeve 110 is the moveable housing 702. Engaged with the circumferential teeth 111 within the cutout 707 is a ratchet clip. Spring 140 is present between the first end 703a of the body 703 and the anti-rotation washer 150.

Figure 29:
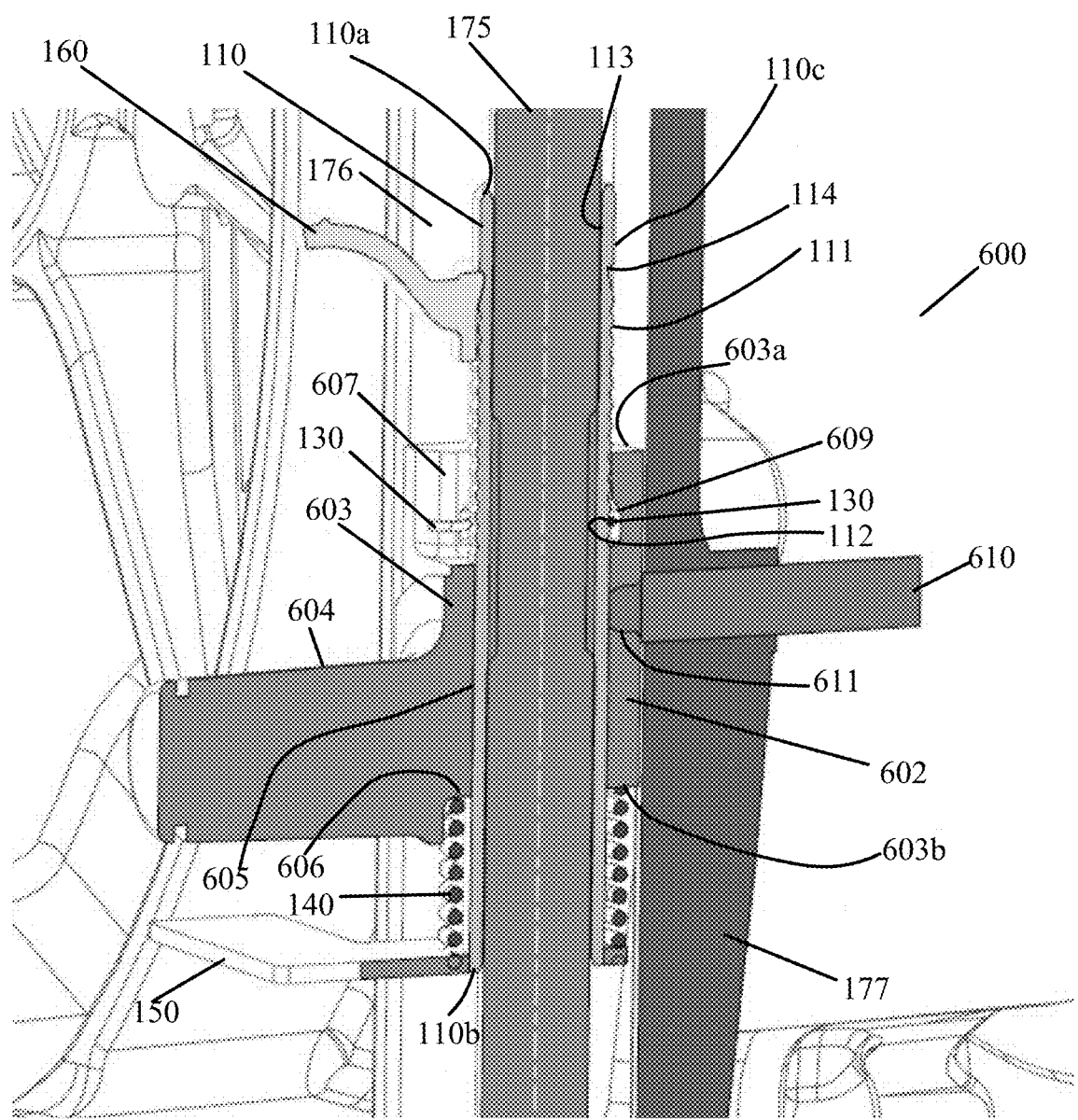
FIG. 29 shows another alternate tensioner assembly within the chain drive system with a delivery pin present and inserted into the moveable housing.

FIG. 29 shows another alternate automatic mechanical tensioner assembly 600 within the chain drive system with a delivery pin 610 present and inserted into the moveable tensioner housing 602. The automatic mechanical tensioner assembly 600 is installed within a hole or bore 176 of a chain drive case 177 that houses a chain drive system with a chain spanning a driven and a driving sprocket.

The automatic mechanical tensioner assembly 600 has a hollow sleeve 110 having a first end 110a and a second end 110b with a series of circumferential teeth 111 on an outer circumference 110c thereof extending a length between the first end 110a and the second end 110b. At least one of the circumferential teeth is a stop groove 112. The circumferential teeth 111 are formed and spaced to receive a ratchet clip 130. The circumferential teeth 111 and stop groove 112 are angled towards the second end 110b of the hollow sleeve 110. In one embodiment, the circumferential teeth 111 and the stop groove 112 are proximate to the first end 110a of the hollow sleeve 110. Alternatively, the circumferential teeth 111 and stop groove 112 are proximate to the second end 110b of the hollow sleeve 110.

The hollow sleeve 110 defines an inner bore 113. The inner bore 113 of the hollow sleeve 110 receives a threaded screw rod 175. A delivery groove 114 is also present along the outer circumference 110c proximal to the first end 110a sized to receive collar 160. A ratchet clip 130 engages with the circumferential teeth 111 of the hollow sleeve 110.

A moveable tensioner housing 602 has a body 603 connected to a radially extending flange 604. The body 603 has a first end 603a and a second end 603b and defines a bore 605 coaxial to the hollow sleeve 110 and surrounds at least a portion of the hollow sleeve 110. The bore 605 extends from the first end 603a to the second end 603b of the body 603. The radially extending flange 604 is perpendicular to the bore 605 defined by the body 603 of the moveable tensioner housing 602 and receives a tensioner face (not shown). Within the bore 605 of the body 603 are ratchet clip grooves 609.

The body 603 has a cutout 607 at the placement of the grooves to allow the ratchet clip legs 132 to extend outwards therefrom, such that manual manipulation of the ratchet clip 130 can take place.

Engagement of the ratchet clip 130 with the circumferential teeth 111 of the hollow sleeve 110 in combination with the bore 605 of the moveable tensioner housing 602 guides the movement of the moveable tensioner housing 602 relative to the hollow sleeve 110 which is fixed, allowing the extension of the hollow sleeve 110 from the moveable tensioner housing 602.

Adjacent the second end 603b of the body 603 of the moveable tensioner housing 602 and surrounding the outer circumference 110c of the hollow sleeve 110 extending from the second end 603b of the body 603 is a spring 140. The first end 140a of the spring 140 engages with a shoulder 606 of the radially extending flange 604 and a second end 140b of the spring 140 engages with an anti-rotation washer 150 engaged with the second end 110b of the hollow sleeve 110. The spring 140 surrounds the outer circumference 110c of the hollow sleeve 110 between the anti-rotation washer 150 and the second end 603b of the moveable tensioner housing 602. The spring 140 biases the moveable tensioner housing 602 towards the first end 110a of the hollow sleeve 110. The moveable tensioner housing 602 additionally has a hole 611 between the first end and the second end for receiving a delivery pin 610 when the automatic mechanical tensioner assembly 100 is in the shipping and installation position.

An anti-rotation washer 150 which receives the second end 110b of the hollow sleeve 110.

The collar 160 is received at the first end 110a of the hollow sleeve 110 and engages with the delivery groove 114 of the hollow sleeve 110. The two axially extending flanges 162 engage with the first end 603a of the moveable tensioner housing 602.

The automatic mechanical tensioner assembly 600 has a shipping and installation position in which the automatic mechanical tensioner assembly 600 is locked into place and rendered unmovable. In the shipping and installation position, the collar 160 is engaged with the delivery groove 114 of the hollow sleeve 110, moving the moveable tensioner housing 602 to a position where the spring 140 is compressed.

The shipping and installation position is maintained by engagement of the collar 160 with the delivery groove 114 at the first end 110a of the hollow sleeve 110, the insertion of the delivery pin 610 with the hole 611 of the moveable tensioner housing 602, as well as the circumferential teeth 111 and stop groove 112 on the outer circumference 110c of the hollow sleeve 110. It is noted that the delivery pin 610 passes through the chain drive housing 177 from the back of the housing to engage with the hole 611 of the moveable tensioner housing 602.

To install the automatic mechanical tensioner assembly 600 into the chain drive system, in the shipping and installation position, the automatic mechanical tensioner assembly 600 absent the tensioner face 250 is dropped into the bore 176 within the chain drive housing 177. The automatic mechanical tensioner assembly 600 is assembled with the moveable tensioner housing 102 surrounding the hollow sleeve 110, the collar 160 engaged with the delivery groove 114 of the hollow sleeve 110, the spring 140 biasing the moveable tensioner housing 102 and the associated anti-rotation washer 150 receiving a second end 110b of the hollow sleeve 110. The ratchet clip 130 is engaged with the stop groove 112 of the hollow sleeve 110.

A screw rod 175 is then dropped into the bore 176 and engages within the inner bore 113 of the hollow sleeve 110 and stabilizes the automatic mechanical tensioner assembly 600 in place.

Next, the tensioner face 250 is installed onto the radially extending flange 604 of the moveable housing 602.

The automatic mechanical tensioner assembly 600 is then pretensioned. After the automatic mechanical tensioner assembly 600 is pretensioned, the collar 160 is removed by grasping and pulling the collar tab 165 of the collar 160 to disengage the collar 160 from the delivery groove 114 on the hollow sleeve 110 and the delivery pin 610 is inserted into bore 611 of the moveable tensioner housing 602 and the chain drive housing 177. Use of the delivery pin 610 allows the tensioner to be installed in places where the covers on the chain drive housing 177 may be not removed. Once the delivery pin 610 is removed from the bore 611, the moveable tensioner housing 602 is biased towards the first end 110*a* of the hollow sleeve 110 by the spring 140 and in a working position.

It is noted that in any of the embodiments above, while one anti-rotation washer 150 is shown, more than one anti-rotation washer can be used and stacked on top of each other.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An automatic mechanical tensioner assembly comprising:
   a hollow sleeve having a first end and a second end, an inner bore extending from the first end to the second end and an outer circumference comprising a delivery groove;
   a moveable housing having a body with a first end and a second end and a flange extending axially therefrom, the body defining a bore receiving the hollow sleeve and a cutout;
   an anti-rotation washer comprising a body defining a hole for receiving the second end of the hollow sleeve;
   a spring between the moveable housing and the anti-rotation washer, biasing the moveable housing towards the first end of the hollow sleeve; and
   a collar comprising a semicircular body defining an inner circumference extending from a first end to a second end of the semicircular body, the semicircular body comprising two axially extending flanges defining a cutout, and a collar tab extending radially from the semicircular body; wherein the inner circumference of the collar receives the delivery groove;
   wherein in a shipping and installation position, the first end of the collar engages with the delivery groove of the hollow sleeve, biasing the moveable housing towards the anti-rotation washer and compressing the spring.

2. The automatic mechanical tensioner assembly of claim 1, further comprising:
   a plurality of circumferential teeth on the outer circumference of the hollow sleeve;
   the bore of the moveable housing comprising a ratchet clip groove proximal to the first end of the body; and
   a ratchet clip received within the ratchet clip groove of the moveable housing and engageable with the plurality of circumferential teeth of the hollow sleeve.

3. The automatic mechanical tensioner assembly of claim 2, wherein the ratchet clip grooves comprises a first portion of a first diameter at the first end of the body, the first portion connected to a second portion of a second diameter, the second portion connected to a third portion of a third diameter through a transition portion.

4. The automatic mechanical tensioner assembly of claim 2, wherein the delivery groove is proximal to the first end of the hollow sleeve.

5. The automatic mechanical tensioner assembly of claim 2, wherein the delivery groove is proximal to the second end of the hollow sleeve.

6. The automatic mechanical tensioner assembly of claim 5, wherein the cutout of the moveable housing is misaligned with the flange of the moveable housing.

7. The automatic mechanical tensioner assembly of claim 5, wherein the cutout of the moveable housing is aligned with the flange of the moveable housing.

8. The automatic mechanical tensioner assembly of claim 2, wherein the second end of the hollow sleeve further comprises a flange.

9. The automatic mechanical tensioner assembly of claim 8, wherein the anti-rotation washer is placed adjacent to the flange at the second end of the hollow sleeve.

10. The automatic mechanical tensioner assembly of claim 1, wherein the moveable housing further comprises a shoulder at the second end of the body engaging with the spring.

11. The automatic mechanical tensioner assembly of claim 1, wherein the flange is perpendicular to the bore of the movable housing.

12. The automatic mechanical tensioner assembly of claim 1, wherein each of the two axially extending flanges of the collar further comprises a ridge extending from the first end to the second end of the semicircular body.

13. The automatic mechanical tensioner assembly of claim 1, wherein the cutout of the collar has milled or rolled edges.

14. The automatic mechanical tensioner assembly of claim 1, wherein the collar tab is aligned with the flange of the moveable housing in the shipping and installation position.

15. The automatic mechanical tensioner assembly of claim 1, wherein the cutout of the moveable housing is misaligned with the flange of the moveable housing.

16. The automatic mechanical tensioner assembly of claim 1, wherein the cutout of the moveable housing is aligned with the flange of the moveable housing.

17. The automatic mechanical tensioner assembly of claim 1, wherein the delivery groove is proximal to the first end of the hollow sleeve.

18. An automatic mechanical tensioner assembly comprising:
   a hollow sleeve having a first end and a second end, an inner bore extending from the first end to the second end and an outer circumference comprising a plurality of circumferential teeth and an installation groove having a first installation groove edge and a second installation groove edge defined on the outer circumference proximal to the second end;
   a moveable housing having a body with a first end and a second end and a flange extending axially therefrom, the body defining a bore extending from the first end to the second end and comprising a ratchet clip groove proximal to the first end of the body and a shipping installation housing groove proximal to the second end of the body, the shipping installation housing groove comprises a first undercut groove; first housing groove edge and a second undercut groove and a second housing groove edge, wherein the bore of the moveable housing receives the hollow sleeve;
   a ratchet clip received within the ratchet clip groove of the moveable housing and engageable with the plurality of circumferential teeth of the hollow sleeve;
   a retaining clip received within the shipping installation housing groove and/or the installation groove of the hollow sleeve;
   an anti-rotation washer comprising a body defining a hole for receiving the second end of the hollow sleeve; and
   a spring between the moveable housing and the anti-rotation washer, biasing the moveable housing towards the first end of the hollow sleeve;

wherein in a shipping and installation position, the retaining clip engages the first installation groove edge of the installation groove of the hollow sleeve and the second housing groove edge of the moveable housing; and wherein in a working position, the retaining clip engages the first undercut groove and first housing groove edge.

19. The automatic mechanical tensioner assembly of claim 18, wherein the ratchet clip groove comprises a first portion of a first diameter at the first end of the body, the first portion connected to a second portion of a second diameter, the second portion connected to a third portion of a third diameter through a transition portion.

20. The automatic mechanical tensioner assembly of claim 18, wherein the moveable housing further comprises a shoulder at the second end of the body engaging with the spring.

21. The automatic mechanical tensioner assembly of claim 18, wherein the flange is perpendicular to the bore of the moveable housing.

22. A method of installing an automatic mechanical tensioner assembly comprising:

inserting an automatic mechanical tensioner assembly into a bore in the chain drive system in a shipping and installation position, the automatic mechanical tensioner assembly comprising: a hollow sleeve having a first end and a second end, an inner bore extending from the first end to the second end and an outer circumference comprising a plurality of circumferential teeth and a delivery groove proximal to the plurality of circumferential teeth and the first end; a moveable housing having a body with a first end and a second end and a flange extending axially therefrom, the body defining a bore comprising a ratchet clip groove proximal to the first end of the body, wherein the bore receives the hollow sleeve; a ratchet clip received within the ratchet clip groove of the moveable housing and engageable with the plurality of circumferential teeth of the hollow sleeve; an anti-rotation washer comprising a body defining a hole for receiving the second end of the hollow sleeve; a spring between the moveable housing and the anti-rotation washer, biasing the moveable housing towards the first end of the hollow sleeve; a collar comprising a semicircular body defining an inner circumference extending from a first end to a second end of the semicircular body, the semicircular body comprising two axially extending flanges defining a cutout, and a collar tab extending radially from the semicircular body, wherein in the shipping and installation position, the first end of the collar engages with the delivery groove of the hollow sleeve, biasing the moveable housing towards the anti-rotation washer and compressing the spring;

inserting a screw rod into the bore of the chain drive and the inner bore of the hollow sleeve;

mounting the tensioner face to the radially extending flange of the moveable housing of the automatic mechanical tensioner installed within the bore of the chain drive;

pretensioning the automatic mechanical tensioner assembly; and removing the collar by disengaging the collar from the delivery groove on the hollow sleeve, such that the automatic mechanical tensioner is in a working position.

23. The method of claim 22, wherein the inner circumference of the collar receives the plurality of circumferential teeth and the delivery groove in the shipping and installation position.

24. An automatic mechanical tensioner assembly comprising:

a hollow sleeve having a first end and a second end, an inner bore extending from the first end to the second end and an outer circumference comprising a plurality of circumferential teeth and a delivery groove proximal to the plurality of circumferential teeth and the first end;

a moveable housing having a body with a first end and a second end and a flange extending axially therefrom, the body defining a bore comprising a ratchet clip groove proximal to the first end of the body, wherein the bore receives the hollow sleeve and a pin hole;

a ratchet clip received within the ratchet clip groove of the moveable housing and engageable with the plurality of circumferential teeth of the hollow sleeve;

an anti-rotation washer comprising a body defining a hole for receiving the second end of the hollow sleeve;

a spring between the moveable housing and the anti-rotation washer, biasing the moveable housing towards the first end of the hollow sleeve; and a pin receivable within the pin hole of the moveable housing;

a collar comprising a semicircular body defining an inner circumference extending from a first end to a second end of the semicircular body, the semicircular body comprising two axially extending flanges defining a cutout, and a collar tab extending radially from the semicircular body; wherein the inner circumference of the collar receives the plurality of circumferential teeth and the delivery groove;

wherein in a shipping and installation position, the first end of the collar engages with the delivery groove of the hollow sleeve, biasing the moveable housing towards the anti-rotation washer and compressing the spring and the pin is received within the pin hole of the moveable housing, maintaining the moveable housing in a stationary position.

25. The automatic mechanical tensioner assembly of claim 24, wherein the pin is received through a chain drive housing in which the automatic mechanical tensioner assembly is installed.

* * * * *